(12) United States Patent
Backholm et al.

(10) Patent No.: US 9,973,965 B2
(45) Date of Patent: May 15, 2018

(54) TRANSPORT PROTOCOL LAYER OPTIMIZATION FOR MANAGING SIGNALING AND POWER CONSUMPTION

(71) Applicant: Seven Networks, LLC, Marshall, TX (US)

(72) Inventors: Ari Backholm, Los Altos, CA (US); Michael Luna, San Jose, CA (US)

(73) Assignee: Seven Networks, LLC, Marshall, TX (US)

( * ) Notice: Subject to any disclaimer, the term of this patent is extended or adjusted under 35 U.S.C. 154(b) by 393 days.

(21) Appl. No.: 14/474,324

(22) Filed: Sep. 2, 2014

(65) Prior Publication Data

US 2015/0016261 A1   Jan. 15, 2015

Related U.S. Application Data

(63) Continuation of application No. PCT/US2014/046522, filed on Jul. 14, 2014.
(Continued)

(51) Int. Cl.
*H04W 28/02* (2009.01)
*H04L 12/801* (2013.01)
(Continued)

(52) U.S. Cl.
CPC ......... *H04W 28/0289* (2013.01); *H04L 47/12* (2013.01); *H04L 47/14* (2013.01);
(Continued)

(58) Field of Classification Search
CPC ....... H04L 47/193; H04L 47/12; H04L 47/14; H04L 47/746; H04L 41/0654;
(Continued)

(56) References Cited

U.S. PATENT DOCUMENTS 6,118,771 A    9/2000 Tajika et al.
7,634,558 B1   12/2009 Mangal
(Continued)

OTHER PUBLICATIONS

Final Office Action dated Mar. 26, 2015 for application No. 13844787.
(Continued)

*Primary Examiner* — Ian N Moore
*Assistant Examiner* — Phong La
(74) *Attorney, Agent, or Firm* — NK Patent Law, PLLC

(57) ABSTRACT

Systems and methods for optimizing signaling in a mobile network and conserving battery resources based on transport protocol layer such as Transmission Control Protocol (TCP) layer optimization techniques are disclosed. A distributed proxy system, in various embodiments, can implement one or more optimization techniques including deferring TCP socket closures or closing network sockets with TCP RST instead of TCP FIN to save on signaling in the wireless (e.g., mobile network) and conserve battery resources. In some embodiments, the disclosed system can implement various methods to prevent or reduce number of TCP and/or application level retries, and thereby reduce signaling in the wireless network and conserve battery resources. In other embodiments, the distributed proxy system can multiplex all TCP sockets in a mobile device through a single socket to reduce TCP/IP overhead and thus conserve device and network resources.

10 Claims, 20 Drawing Sheets

Related U.S. Application Data

(60) Provisional application No. 61/845,819, filed on Jul. 12, 2013, provisional application No. 61/847,494, filed on Jul. 17, 2013, provisional application No. 61/905,120, filed on Nov. 15, 2013.

(51) Int. Cl.
  *H04L 12/841* (2013.01)
  *H04L 12/823* (2013.01)
  *H04L 12/815* (2013.01)

(52) U.S. Cl.
  CPC ............ *H04L 47/283* (2013.01); *H04L 47/32* (2013.01); *H04L 47/193* (2013.01); *H04L 47/22* (2013.01); *Y02B 60/50* (2013.01)

(58) Field of Classification Search
  CPC . H04L 67/1034; H04L 67/1048; H04L 69/40; H04W 28/0289
  See application file for complete search history.

(56) References Cited

U.S. PATENT DOCUMENTS

| | | |
|---|---|---|
| 8,332,500 B1 | 12/2012 | Singleton et al. |
| 2001/0036822 A1 | 11/2001 | Mead et al. |
| 2002/0107042 A1 | 8/2002 | Murnaghan et al. |
| 2003/0009571 A1 | 1/2003 | Bavadekar |
| 2003/0046433 A1 | 3/2003 | Luzzatti et al. |
| 2003/0055555 A1 | 3/2003 | Knockeart et al. |
| 2004/0218609 A1 | 4/2004 | Foster |
| 2004/0111518 A1 | 6/2004 | Schuyler |
| 2004/0125800 A1 | 7/2004 | Zellner |
| 2004/0192312 A1* | 9/2004 | Li ............... H04L 1/16 455/445 |
| 2004/0264396 A1 | 12/2004 | Ginzburg et al. |
| 2006/0149845 A1* | 7/2006 | Malin ............ H04L 67/322 709/228 |
| 2006/0179147 A1* | 8/2006 | Tran ............. G06F 11/2012 709/227 |
| 2006/0195547 A1* | 8/2006 | Sundarrajan ........ H04L 69/163 709/217 |
| 2006/0195840 A1* | 8/2006 | Sundarrajan ........... G06F 8/61 717/176 |
| 2006/0240805 A1 | 10/2006 | Backholm et al. |
| 2006/0259661 A1* | 11/2006 | Feng ............ H04L 69/163 710/39 |
| 2006/0294388 A1 | 12/2006 | Abraham et al. |
| 2007/0021065 A1 | 1/2007 | Sengupta et al. |
| 2007/0171921 A1* | 7/2007 | Wookey ............... G06F 3/1415 370/401 |
| 2007/0198634 A1 | 8/2007 | Knowles et al. |
| 2007/0202850 A1 | 8/2007 | Pantalone et al. |
| 2007/0244987 A1* | 10/2007 | Pedersen ............ H04L 63/0272 709/217 |
| 2007/0286136 A1* | 12/2007 | Rittle ................ H04W 8/005 370/338 |
| 2008/0008165 A1* | 1/2008 | Ikeda ................ H04L 45/00 370/360 |
| 2008/0045253 A1 | 2/2008 | Mousseau et al. |
| 2008/0140794 A1 | 6/2008 | Rybak |
| 2008/0146257 A1 | 6/2008 | Clegg |
| 2008/0148291 A1 | 6/2008 | Huang |
| 2008/0170852 A1* | 7/2008 | Santoro ............. H04B 10/0773 398/15 |
| 2008/0305839 A1 | 12/2008 | Karaoguz et al. |
| 2009/0049482 A1 | 2/2009 | Auerbach et al. |
| 2009/0198766 A1 | 8/2009 | Chen et al. |
| 2009/0232001 A1 | 9/2009 | Gong et al. |
| 2009/0252072 A1 | 10/2009 | Lind |
| 2009/0275320 A1 | 11/2009 | Marshall |
| 2010/0083255 A1 | 4/2010 | Bane et al. |
| 2010/0099421 A1 | 4/2010 | Patel |
| 2010/0180082 A1 | 7/2010 | Sebastian et al. |
| 2010/0217965 A1* | 8/2010 | Wolff ................ H04L 12/10 713/2 |
| 2010/0235464 A1 | 9/2010 | Iyer |
| 2010/0250701 A1* | 9/2010 | Harvell ............... H04L 47/193 709/217 |
| 2010/0293286 A1 | 11/2010 | Nikkila |
| 2010/0312899 A1* | 12/2010 | Herzog ............... H04L 67/141 709/228 |
| 2011/0047413 A1* | 2/2011 | McGill ............... G06F 11/1662 714/15 |
| 2011/0119478 A1 | 5/2011 | Jackson |
| 2011/0170464 A1 | 7/2011 | Sengottaiyan |
| 2011/0177847 A1 | 7/2011 | Huang |
| 2011/0199905 A1 | 8/2011 | Pinheiro et al. |
| 2012/0023226 A1 | 1/2012 | Petersen et al. |
| 2012/0071141 A1* | 3/2012 | Nicoara ............. H04L 47/14 455/414.1 |
| 2012/0139694 A1 | 6/2012 | Pineua |
| 2012/0149352 A1 | 6/2012 | Backholm et al. |
| 2012/0155296 A1 | 6/2012 | Kashanian |
| 2012/0166865 A1* | 6/2012 | Liu ............... H04H 20/82 714/4.11 |
| 2012/0170556 A1 | 7/2012 | Tsfati et al. |
| 2012/0170557 A1 | 7/2012 | Tsfati et al. |
| 2012/0173901 A1* | 7/2012 | Soliman ............. H04W 88/182 713/320 |
| 2012/0185577 A1* | 7/2012 | Giaretta ............... H04W 4/003 709/223 |
| 2012/0278400 A1* | 11/2012 | Elson ................... H04L 47/722 709/206 |
| 2012/0281561 A1 | 11/2012 | Shukla |
| 2012/0324110 A1* | 12/2012 | Kohli ................. H04L 63/0281 709/226 |
| 2013/0036428 A1 | 2/2013 | Lei |
| 2013/0070640 A1* | 3/2013 | Chapman ............ H04L 12/2801 370/254 |
| 2013/0078999 A1 | 3/2013 | Martin et al. |
| 2013/0083713 A1 | 4/2013 | Johansson et al. |
| 2013/0279384 A1* | 10/2013 | Wei ................... H04W 52/0258 370/311 |
| 2013/0316716 A1 | 11/2013 | Tapia et al. |
| 2013/0336179 A1 | 12/2013 | Rubin et al. |
| 2014/0035722 A1* | 2/2014 | Kincaid ............. G07C 9/00111 340/5.61 |
| 2014/0237067 A1 | 8/2014 | Todd |
| 2015/0212918 A1 | 7/2015 | Cai |

OTHER PUBLICATIONS

Final Office Action dated Mar. 20, 2015 for application No. 13844704.
Non-Final Office Action dated Jun. 11, 2015 for U.S. Appl. No. 13/815,921 and Notice of References Cited.
Non-Final Office Action dated Jun. 24, 2015 for U.S. Appl. No. 14/223,689 and Notice of References Cited.
Non-Final Office Action dated Jul. 21, 2015 for application No. 13351176.
Non-Final Office Action dated Jul. 17, 2015 for application No. 13178598.
Final rejection dated Aug. 20, 2015 for application No. 13758842.
Non-Final Rejection dated Jul. 29, 2015 for application No. 13815908.
Non-Final rejection dated Aug. 21, 2015 for application No. 13844704.
Final rejection dated Jul. 14, 2015 for application No. 14474248.
Final Office Action dated Aug. 28, 2015 for U.S. Appl. No. 14/223,689 and Notice of References Cited.
Final Office Action dated Aug. 20, 2015 for U.S. Appl. No. 13/758,842.
Non-Final Office Action dated Oct. 1, 2015 for U.S. Appl. No. 13/844,787.
Final Office Action dated Aug. 21, 2015 for U.S. Appl. No. 13/844,704 and Notice of References Cited.
Non-Final Office Action dated Aug. 25, 2015 for U.S. Appl. No. 13/844,682 and Notice of References Cited.

(56) References Cited

OTHER PUBLICATIONS

USPTO Final Office Action dated Nov. 4, 2015 for U.S. Appl. No. 13/115,740.
USPTO, Final Rejection for U.S. Appl. No. 13/178,598, dated Jan. 4, 2016.
USPTO, Non-Final Rejection for U.S. Appl. No. 14/223,689, dated Jan. 26, 2016.
USPTO, Final Rejection for U.S. Appl. No. 13/844,787, dated May 16, 2016.
USPTO, Non-Final Rejection for U.S. Appl. No. 13/115,740, dated Apr. 28, 2016.
PCT Search Report dated Nov. 7, 2014 for PCT application No. PCT/US2014/046522.
IPRP for International Application PCT/US2012/068612 dated Jun. 19, 2014.
Non-Final Office Action dated May 29, 2015 for application No. 13115740.
Non-Final Office Action dated Jul. 16, 2015 for application No. 13758842.
USPTO, Final Office Action in U.S. Appl. No. 14/474,231 dated Aug. 10, 2017.

* cited by examiner

TRANSPORT PROTOCOL LAYER OPTIMIZATION FOR MANAGING SIGNALING AND POWER CONSUMPTION

CROSS-REFERENCE TO RELATED APPLICATIONS

The present application is a continuation of Patent Cooperation Treaty Application No. PCT/US14/4522 titled "Transport Protocol Layer Optimization for Managing Signaling and Power Consumption" filed on Jul. 14, 2014 and claims priority to and benefit from U.S. Provisional Patent Application Ser. No. 61/845,819 titled "Protocol Layer Optimization Techniques for Managing Signaling and Power Consumption" filed on Jul. 12, 2013, U.S. Provisional Patent Application Ser. No. 61/847,494 titled "Protocol Layer Optimization Techniques for Managing Signaling and Power Consumption" filed on Jul. 17, 2013, and U.S. Provisional Patent Application Ser. No. 61/905,120 titled "Optimization of Signaling Caused by Session Closures" filed on Nov. 15, 2013. The aforementioned applications are expressly incorporated by reference herein.

BACKGROUND

The Transport Control Protocol (TCP) is a network communication protocol that many applications on network devices employ to communicate with each other over Internet Protocol (IP) networks. TCP is a connection oriented protocol and includes establishing a connection between two end points (e.g., a client and a server or a client-side socket and a server-side socket) in order to send data over the connection. Establishment of a connection includes exchange of TCP messages. For example, the client sends a TCP synchronization (SYN) message to the server and in response to receiving the SYN message, the server sends a SYN message and an acknowledgement (ACK) message. The client, upon receiving the SYN-ACK messages from the server, sends an ACK message to the server to complete the three way handshake to establish the connection. Once the connection has been established, data (e.g., using higher level protocol such as the HTTP) can be sent in both directions reliably until the connection is terminated or closed. Terminating the connection involves one of the clients or the server to send a FIN message to indicate that client or the server has no data to send. Thus, establishing and terminating a TCP connection not only causes a radio on a mobile device to power up and power down, but also includes the overhead of sending the SYN, ACK and FIN messages. All of these cause additional signaling in the mobile network.

SUMMARY

FIGS. 1A-1-1A-4 illustrate example signaling diagrams showing transport protocol layer optimization techniques for optimizing signaling in a mobile network and conserving battery resources.

BRIEF DESCRIPTION OF THE DRAWINGS

FIG. 1A-5 illustrates an example diagram showing multiplexing and de-multiplexing of sockets for optimizing signaling in a mobile network and conserving battery resources.

FIG. 1A-6 illustrates an example diagram depicting flow of outgoing traffic from an application through a network stack and a client-side proxy of a distributed proxy and cache system for optimizing signaling in a mobile network and conserving battery resources.

FIG. 2 illustrates a block diagram depicting an example of client-side components in a distributed proxy and cache system, further including one or more components, including a transport protocol layer optimizer for optimizing signaling in a mobile network and conserving battery resources based on transport protocol layer optimization techniques.

FIG. 3 illustrates a block diagram depicting an example of one or more components of a transport protocol optimizer on a mobile device for optimizing signaling in a mobile network and conserving battery resources based on transport protocol layer optimization techniques.

FIG. 4 depicts a block diagram illustrating an example of server-side components in a distributed proxy and cache system, further including can further include a transport protocol layer optimizer for optimizing signaling in a mobile network and conserving battery resources based on transport protocol layer optimization techniques.

FIG. 5 illustrates a block diagram depicting an example of one or more components of a transport protocol layer optimizer on a proxy server for optimizing signaling in a mobile network and conserving battery resources based on transport protocol layer optimization techniques.

FIG. 6 is a logic flow diagram illustrating an example method of delaying socket closures until a radio is on to prevent socket closures from turning on the radio for optimizing signaling in a mobile network and conserving battery resources.

DETAILED DESCRIPTION

Figures 1, 1A:
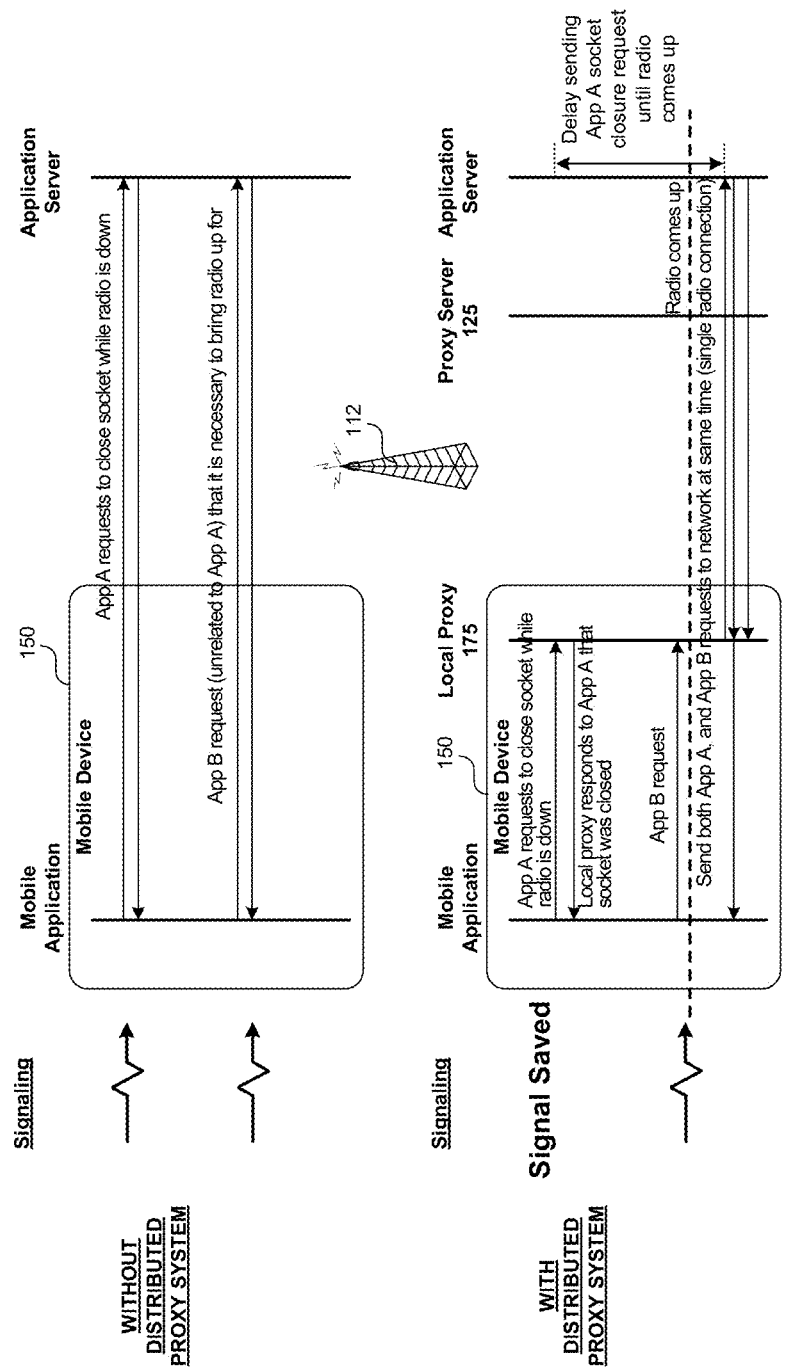
FIGS. 1A-1-1A-4 illustrate example signaling diagrams showing transport protocol layer optimization techniques for optimizing signaling in a mobile network and conserving battery resources.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

As used herein, a "module," "a manager," a "handler," a "detector," an "interface," a "controller," a "normalizer," a "generator," an "invalidator," or an "engine" includes a general purpose, dedicated or shared processor and, typically, firmware or software modules that are executed by the processor. Depending upon implementation-specific or other considerations, the module, manager, handler, detector, interface, controller, normalizer, generator, invalidator, or engine can be centralized or its functionality distributed. The module, manager, handler, detector, interface, controller, normalizer, generator, invalidator, or engine can include general or special purpose hardware, firmware, or software embodied in a computer-readable (storage) medium for execution by the processor.

As used herein, a computer-readable medium or computer-readable storage medium is intended to include all mediums that are statutory (e.g., in the United States, under 35 U.S.C. 101), and to specifically exclude all mediums that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, to name a few), but may or may not be limited to hardware.

Embodiments of the present disclosure include systems and methods for managing signaling in a wireless network (e.g., mobile network) and power consumption by utilizing transport protocol layer optimization techniques.

Protocol layer (e.g., transport protocol layer) optimization techniques include TCP (Transmission Control Protocol) layer optimization techniques for reducing signaling in a mobile network and conserving battery resources on mobile devices.

Embodiments of the present disclosure include a distributed proxy system including a local proxy residing on a mobile device and a proxy server and/or a network-side proxy (i.e., a proxy server residing in or associated with the core network or the radio access network).

Referring to FIG. 1A-1, in some embodiments, a protocol layer optimization technique includes deferring TCP socket closures. As illustrated, without a distributed system (i.e., a local proxy and/or a proxy server), when a mobile application App A on a mobile device 150 sends a request to close a socket while a radio on the mobile device is down, the radio is turned on or activated to send a message (TCP FIN or FIN) to an application server associated with App A to close the socket. The application server then sends a FIN and an acknowledgement message ACK (i.e., FIN-ACK) back to App A, and App A sends an ACK back to the application server, which terminates the connection between App A and its associated application server. Similarly when another mobile application App B sends a request (e.g., a data transfer request) to its associated application server, it may be necessary to bring the radio up to allow the request to go to the network. If the radio is already powered down, the request can cause the mobile device to power up the radio once again. Each radio power up/power down event to close the socket for App A and to send the request from App B causes signaling in the mobile network and drains battery of the mobile device 150.

In the disclosed distributed proxy system, when the same application App A on the mobile device 150 sends a request to close its TCP socket while the radio on the mobile device is down (i.e., powered down or in an idle state), a local proxy 175 residing in the mobile device 150 can defer or delay the closure of the TCP socket until the radio comes up for other reasons (e.g., when there is user interactive traffic, backlight on the mobile device turns on, when a request 111 from App B is received). The local proxy 175 can respond to App A that the socket was closed (e.g., by sending FIN-ACK), without actually closing the socket. This keeps App A satisfied allows the local proxy to prevent the radio from turning on just to close a TCP socket. Consequently, the local proxy thus avoids unnecessary signaling and conserves battery resources. When the radio comes up, the local proxy sends the requests from both App A and App B to their respective application servers using a single radio connection.

Figures 1, 1A, 2:
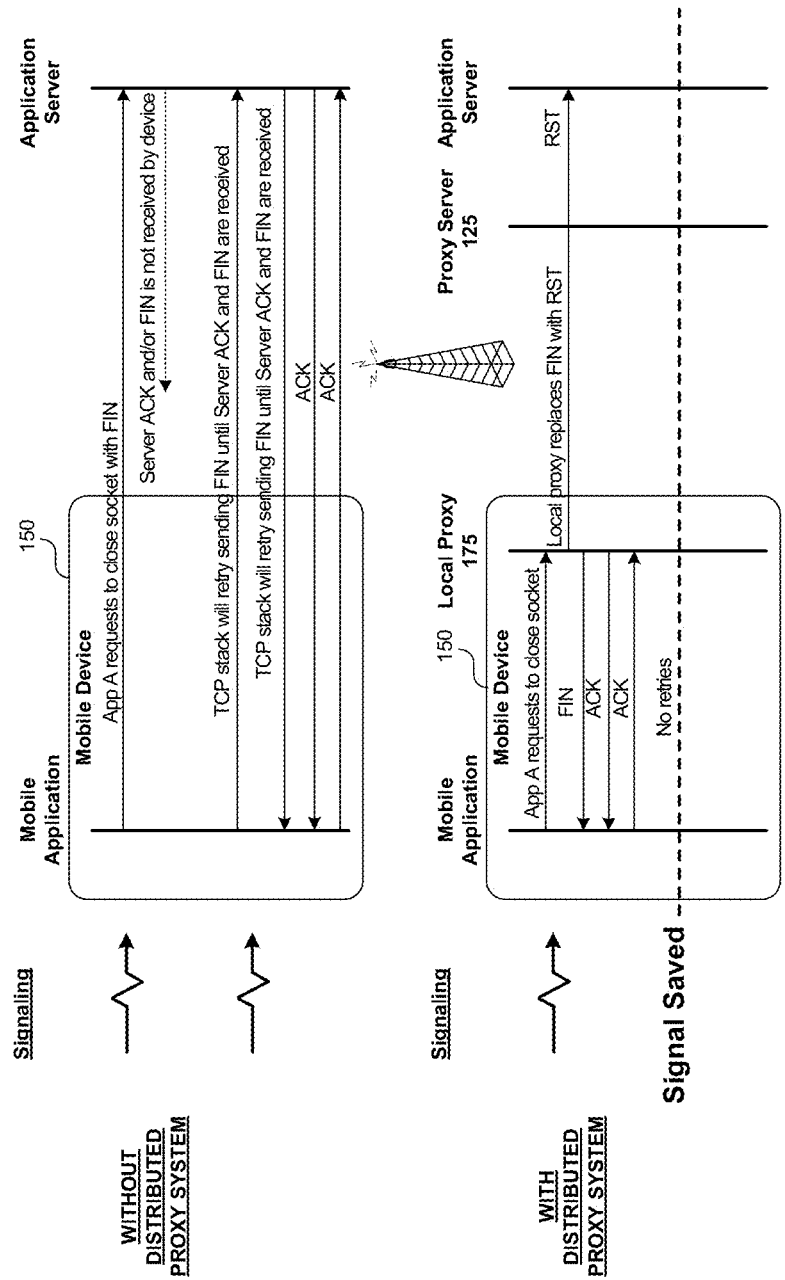

Referring to FIG. 1A-2, in some embodiments, a protocol layer optimization technique includes closing network sockets with a TCP RST (a message to reset a network connection) instead of a FIN (a message to terminate the network connection). Normally, when an application requests a socket closure, a handshake occurs to allow each side to terminate its connection. The TCP stack on the device side sends a FIN, and a corresponding server TCP stack responds with an ACK and a FIN. The TCP stack on the device side then responds with an ACK. When any of these packets/messages get lost in the network (e.g., server ACK and/or FIN is not received by the mobile device), the device stack autonomously (without the application knowing about it) keeps retrying by sending FIN with increasing back off algorithm, which can result in large number of retries (e.g., over 10 retries), with each retry turning the radio on unnecessarily.

The local proxy on the mobile device can avoid this drawback by closing the network socket with an RST, which does not require an acknowledgement back, and does not get retried. For example, as illustrated, when App A requests to close a socket, the local proxy 175 can replace the FIN with an RST and send the RST to the application server. The local proxy 175 can then respond to the request from App A with a FIN/ACK and receive an ACK from the mobile application. Similarly, when the server closes the socket to the device, the server TCP stack typically sends a FIN. The local proxy can then respond with a TCP RST message instead of FIN/ACK messages to avoid FIN/ACK retry loops. This results in savings in signaling and battery resources, particularly in unreliable mobile networks or during time periods when a mobile network is congested, and TCP messages are likely to get dropped or lost in the network.

Referring to FIG. 1A-3, in some embodiments, a protocol layer optimization technique includes a mechanism to stop or reduce the number of retries a TCP stack on a device side makes in an attempt to establish connection. As illustrated, normally, to establish a connection, the TCP stack sends a SYN, to which the server responds with a SYN-ACK, and finally the device TCP stack responds with an ACK. However, when an application attempts to open a new socket in poor network conditions, the TCP stack keeps retrying the TCP SYN to open the socket by sending SYN/ACK with back-off retry algorithm. In one implementation, the local proxy on the mobile device detects that the application has timed out (e.g., from application level timers) after failing to receive SYN-ACK from the application server and is not expecting a response anymore. The local proxy then causes the TCP stack to stop retrying to open the socket. Thus, being aware of the application timeout event allows the local proxy to prevent unnecessary signaling and conserve battery resources.

Referring to FIG. 1A-4, in some embodiments, the local proxy can establish a separate timer to retry less, even if the application has not timed out. The local proxy can do so when, for example, based on an algorithm, the local proxy recognizes or determines that the socket is not going to get opened. Such determination may be based on, for example, status of the destination server (e.g., destination server is down or unavailable, and does not respond), network conditions (e.g., congestion) or the like. The local proxy can then respond to App A's SYN with SYN-ACK and receive from App A an ACK. In this manner, the local proxy can prevent unnecessary retries from occurring on the mobile device and save on signaling and battery resources.

In another embodiment, a protocol layer optimization technique includes blocking application traffic at a mobile device to prevent both TCP and application level retries to attempt to establish a connection. When firewalling mechanisms are established on the network side, both the device TCP stack and the application will keep retrying to establish a failed connection (or individual packets, in case of UDP (User Datagram Protocol)). Furthermore, the retry algorithms have typically been designed to be aggressive, to restore user experience as quickly as possible. As a result, such network-side firewalling mechanisms cause significant battery drain and additional signaling.

The disclosed system has advantages over such network-side firewalling mechanisms. The disclosed system includes a local proxy that acts as a firewall to effectively or efficiently block application traffic at the device, and avoid both TCP and application level retries to save on signaling and battery resources. This helps avoid network requests, TCP and application level retries and additional battery drain and signaling. In some embodiments, the firewall feature of the local proxy may be used for creating service plans that only allow specific applications to be used, and can block other application traffic. In other embodiments, the firewall feature of the local proxy may be used for directing application traffic to operator-friendlier push mechanisms. For example, application traffic can be offloaded to the Google Cloud Messaging channel.

The local proxy can avoid or prevent TCP and application level retries using various methods. For example, the local proxy can either "drop" or "reject" TCP connections from an application, based on compatibility with the application. For example, some applications react better to the "reject" mechanism, where the source TCP socket receives ICMP (Internet Control Message Protocol) Destination Not Available (or destination unreachable) message, and realize that the wireless network is working or fine and is not the cause of the rejection of the TCP connection, and most likely the problem is with the application server. However, some applications (e.g., Skype) respond to the ICMP messages immediately by retrying alternative ports and servers, and behave better if their packets are "dropped" (i.e., not responded to at all). In one implementation, the disclosed system can analyze application responses to "dropped" or "rejected" TCP connections in real time and select a suitable blocking mechanism to minimize retry attempts locally at the mobile device. In another implementation, the disclosed system can analyze in advance application behavior or response to these blocking mechanisms, and select and associate with each application a suitable blocking mechanism that can be applied when TCP connections are to be blocked. Application of these blocking mechanisms locally at the device side by the local proxy allows the mobile device to avoid or minimize retries, and thus save on battery and signaling resources.

In addition to the application traffic blocking on the device side via the local proxy, in some embodiments, the proxy server, and/or a network-side proxy (e.g., a proxy residing in the operator network) may also perform blocking of server initiated traffic (e.g., block unnecessary FIN/ACK packet), and/or provide safe response (e.g., FIN/ACK packets or other cached responses) from the proxy server and/or the network-side proxy to keep the servers happy.

In addition to TCP, the disclosed protocol layer optimization techniques may be applicable to other protocols such as UDP, SCTP (Stream Control Transmission Protocol, and the like.

In some embodiments, the signaling optimization methods, including socket closure methods and/or the protocol layer optimization techniques described above, may be implemented on a local proxy 175/275. In other embodiments, the signaling optimization methods may be implemented on or integrated with operating systems (OS) of client devices. For example, OS manufacturers can implement the disclosed signaling optimization methods in their operating systems. In some implementations, device manufacturers that utilize their own operating systems can include the disclosed signaling optimization methods in their operating systems. Some device manufacturers can also modify or customize third-party operating systems to include the disclosed signaling optimization methods. Inclusion or implementation of the disclosed signaling optimization methods by OS manufacturers and/or device manufacturers in operating systems enable devices with such operating systems to more effectively reduce signaling and conserve battery resources. Operating systems can include any operating systems including but not limited to any previous, current, and/or future versions/releases of, Windows Mobile, iOS, Android, Symbian, Palm OS, Brew MP, Java 2 Micro Edition (J2ME), Blackberry, and the like.

Referring to FIG. 1A-5, in some embodiments, a transport protocol layer optimization technique includes multiplexing all TCP sockets in a mobile device through a single socket over a wireless (e.g., mobile network). For example, the mobile device 150 includes applications 102A-C. Each application has its application-side socket (SA1, SB1 and SC1) and the local proxy or client-side proxy 175 has its own socket (SA2, SB2, SC2) over which the application and the local proxy communicate with each other. Consider that the local proxy 175 has a socket open to the server-side proxy or proxy server 125 to send a request from the application 102A to the application server 110A. When the local proxy receives a request from the mobile application 102B that is directed to an application server 110B, the local proxy first checks if a TCP socket is open to the server-side proxy or proxy server 125. In this example, as there is an open socket to the proxy server 125, the local proxy 175 sends the request from mobile application 102B through the same TCP socket S3 as any request from the mobile application 102A. In other words, the local proxy 175 multiplexes the TCP sockets for mobile applications 102A and 102B through a single TCP socket. The local proxy of the mobile device can utilize this multiplexing technique to reduce the TCP/IP overhead and achieve signaling and battery savings. Particularly in poor network conditions, the multiplexing technique can result in significant savings in signaling and battery resources since retransmissions for individual socket opening/closures are reduced. The requests sent through the TCP socket are then de-multiplexed at the other end of the TCP connection by the proxy server 125. The proxy server 125 then sends the requests to their respective destinations (e.g., application servers 110A, 110B) over TCP connections between proxy-server side sockets (S5A, S5B, S5C) and application server-side sockets (S6A, S6B, S6C).

In addition to TCP, the disclosed transport protocol layer optimization techniques can be applicable to other protocols such as User Datagram Protocol (UDP), Stream Control Transmission Protocol (SCTP) or the like.

FIG. 1A-6 is a block diagram illustrating flow of traffic from an application through a network stack (TCP stack) and a client-side proxy of a distributed proxy and cache system. As illustrated, the kernel 119g includes the network stack such as the TCP stack including sockets. The client side proxy 175 can include software components or agents installed on the mobile device 150 that can operate transparently for end users and applications, and interface with the device's operating system (OS). In some embodiments, the client-side proxy 175 can be partially or wholly external to or independent of the OS of the mobile device 150. In other embodiments, the client-side proxy 175 can be integrated with or be a part of the OS of the mobile device 150. The OS can include any operating system including but not limited to: any previous, current, and/or future versions/releases of, Windows Mobile, iOS, Android, Symbian, Palm OS, Brew MP, Java 2 Micro Edition (J2ME), Blackberry, and the like. Outgoing TCP traffic from the applications can be intercepted by the client-side proxy 175, which uses the transport protocol layer optimizer 300 (described in FIG. 3) to align outgoing traffic from one or more applications. The aligned traffic is then sent over TCP as outgoing traffic 119b.

Figures 1, 1A, 2, 3:
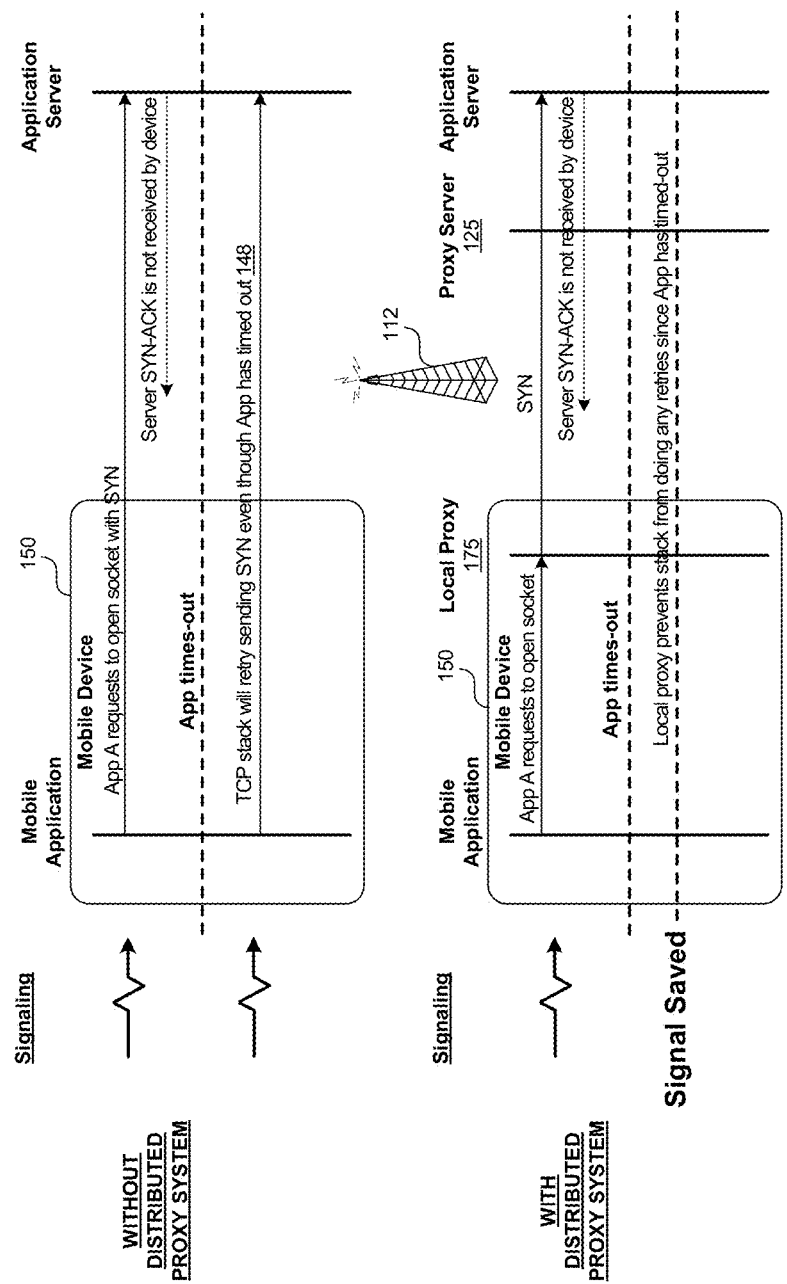
Figures 1, 1A, 2, 3, 4:
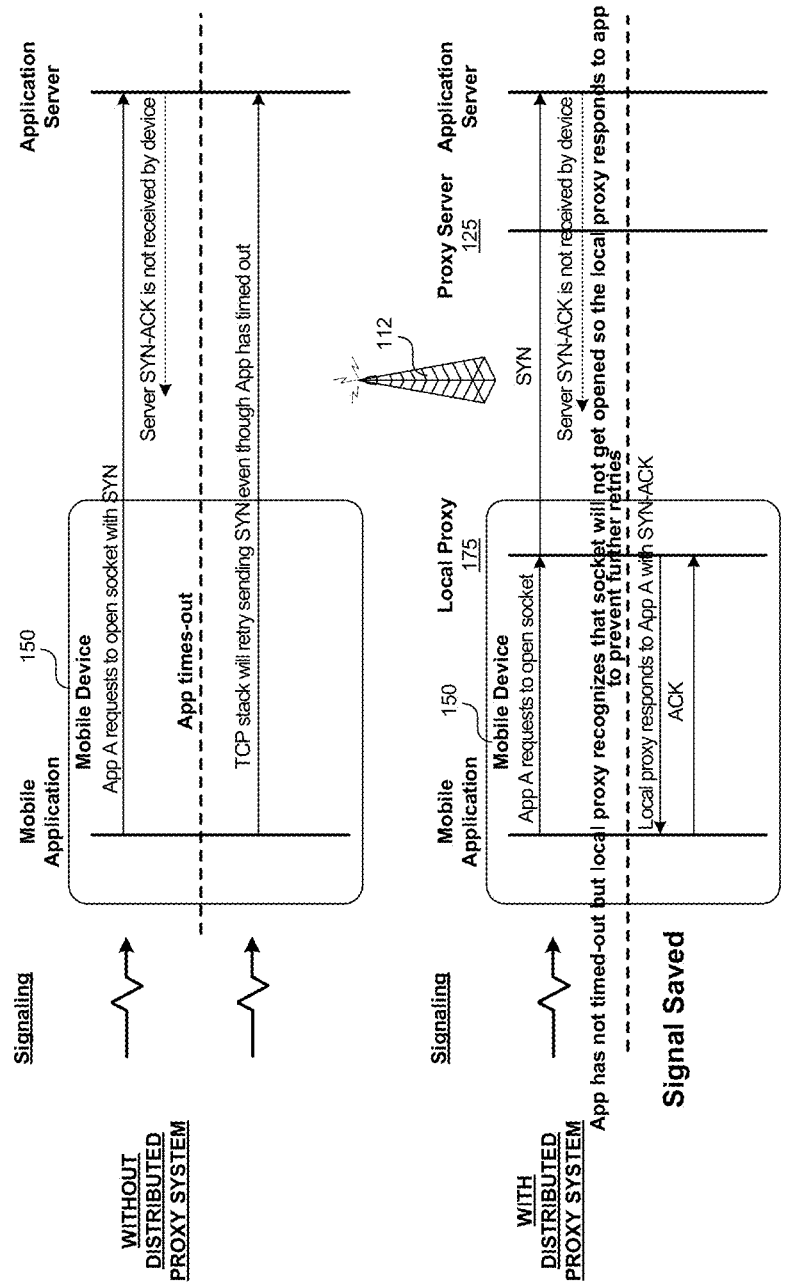
Figures 1, 1A, 2, 3, 4, 5:
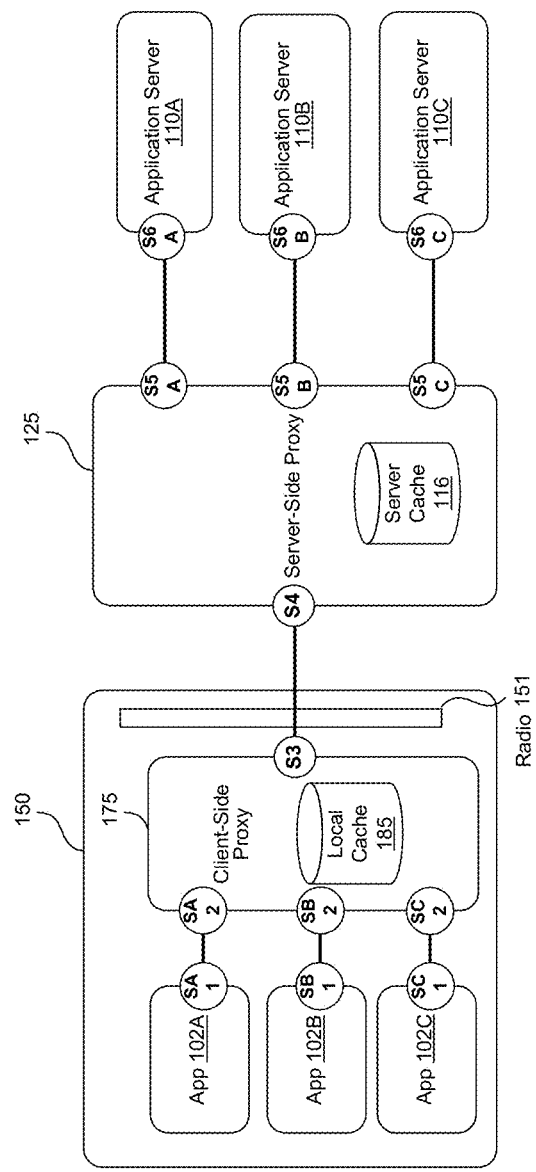
Figures 1, 1A, 2, 3, 4, 5, 6:
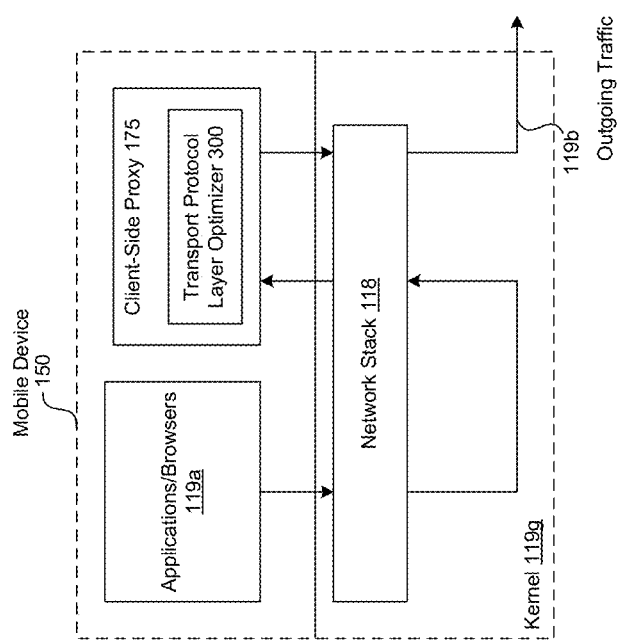
Figure 1B:
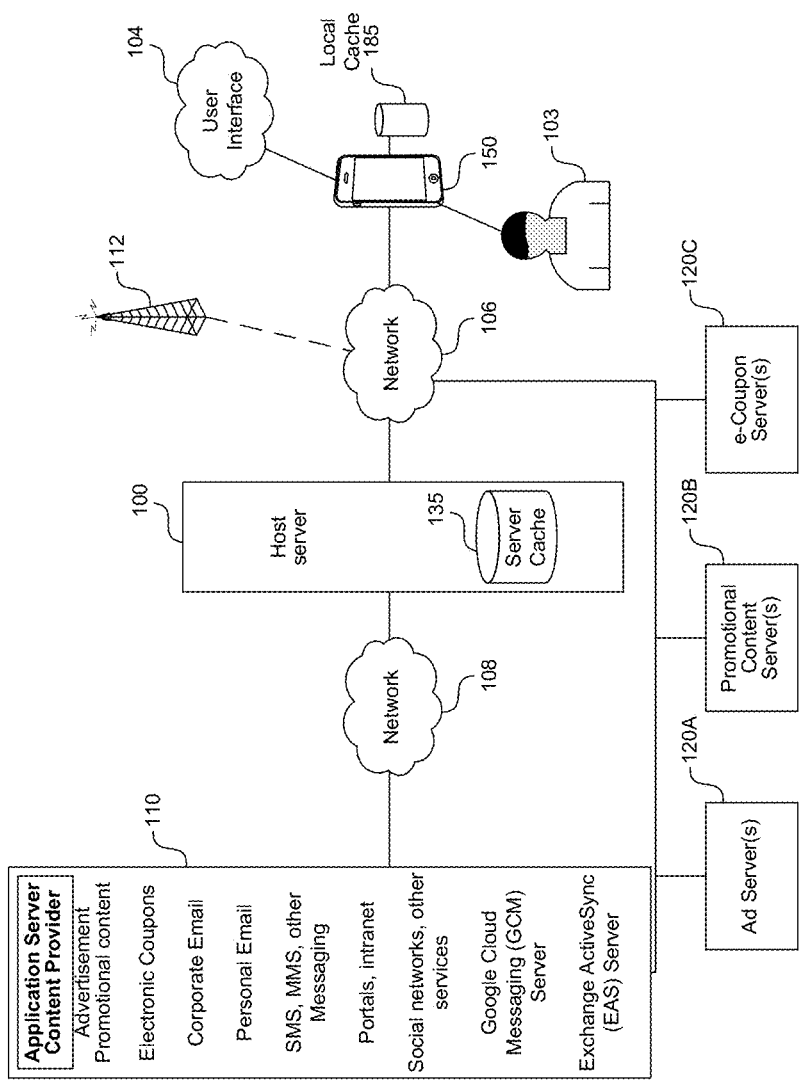
FIG. 1B illustrates an example diagram of a system where a host server facilitates management of traffic, content caching, and/or resource conservation between mobile devices (e.g., wireless devices), an application server or content provider, or other servers such as an ad server, promotional content server, an e-coupon server or messaging servers such as the Google Cloud Messaging (GCM) server and the Exchange ActiveSync (EAS) server in a wireless network (or broadband network) for resource conservation. The host server can further optimize signaling in a mobile network and conserver battery resources based on transport protocol layer optimization techniques.

FIG. 1B illustrates an example diagram of a system where a host server 100 facilitates management of traffic, content caching, and/or resource conservation between mobile devices 150 (e.g., wireless devices), an application server 110 or content provider, or other servers such as an ad server 120A, promotional content server 120B, an e-coupon server 120C or messaging servers such as the Google Cloud Messaging (GCM) server and the Exchange ActiveSync (EAS) server in a wireless network (or broadband network) for resource conservation. The disclosed system can further optimize signaling in a wireless network and conserver battery resources based on transport protocol layer optimization techniques.

The client devices 150 can be any system and/or device, and/or any combination of devices/systems that is able to establish a connection, including wired, wireless, cellular connections with another device, a base station 112, a server and/or other systems such as host server 100 and/or application server/content provider 110. Client devices 150 will typically include a display and/or other output functionalities to present information and data exchanged between among the devices 150 and/or the host server 100 and/or application server/content provider 110. The application server/content provider 110 can by any server including third party servers or service/content providers further including advertisement, promotional content, publication, or electronic coupon servers or services. Similarly, separate advertisement servers 120a, promotional content servers 120b, and/or e-Coupon servers 120c as application servers or content providers are illustrated by way of example.

For example, the client/mobile devices 150 can include mobile, hand held or portable devices, wireless devices, or non-portable devices and can be any of, but not limited to, a server desktop, a desktop computer, a computer cluster, or portable devices, including a notebook, a laptop computer, a handheld computer, a handheld tablet, any portable readers/reading devices, a hand held console, a hand held gaming device or console, a head mounted device, a head mounted display, a thin client or any SuperPhone, and/or any other portable, mobile, hand held devices, or fixed wireless interface such as a M2M device, etc. In one embodiment, the client devices 150 (or mobile devices 150), host server 100, and application server 110 are coupled via a network 106 and/or a network 108. In some embodiments, the devices 150 and host server 100 may be directly connected to one another.

The input mechanism on client devices 150 can include touch screen keypad (including single touch, multi-touch, gesture sensing in 2D or 3D, etc.), a physical keypad, a mouse, a pointer, a track pad, a stylus, a stylus detector/sensor/receptor, motion detector/sensor (e.g., including 1-axis, 2-axis, 3-axis accelerometer, etc.), a face detector/recognizer, a retinal detector/scanner, a light sensor, capacitance sensor, resistance sensor, temperature sensor, proximity sensor, a piezoelectric device, device orientation detector (e.g., electronic compass, tilt sensor, rotation sensor, gyroscope, accelerometer), or any combination of the above.

Signals received or detected indicating user activity at client devices 150 through one or more of the above input mechanism, or others, can be used in the disclosed technology in acquiring context awareness at the client device 150. Context awareness at client devices 150 generally includes, by way of example but not limitation, client device 150 operation or state acknowledgement, management, user activity/behavior/interaction awareness, detection, sensing, tracking, trending, and/or application (e.g., mobile applications) type, behavior, activity, operating state, etc.

Context awareness in the present disclosure also includes knowledge and detection of network side contextual data and can include network information such as network capacity, bandwidth, traffic, type of network/connectivity, and/or any other operational state data. Network side contextual data can be received from and/or queried from network service providers (e.g., cell provider 112 and/or Internet service providers) of the network 106 and/or network 108 (e.g., by the host server and/or devices 150). In addition to application context awareness as determined from the client 150 side, the application context awareness may also be received from or obtained/queried from the respective application/service providers 110 (by the host 100 and/or client devices 150).

The host server 100 can use, for example, contextual information obtained for client devices 150, networks 106/108, applications (e.g., mobile applications), application server/provider 110, or any combination of the above, to manage the traffic in the system to satisfy data needs of the client devices 150 (e.g., to satisfy application or any other request including HTTP request). In one embodiment, the traffic is managed by the host server 100 to satisfy data requests made in response to explicit or non-explicit user 103 requests and/or device/application maintenance tasks. The traffic can be managed such that network consumption, for example, use of the cellular network is conserved for effective and efficient bandwidth utilization. In addition, the host server 100 can manage and coordinate such traffic in the system such that use of device 150 side resources (e.g., including but not limited to battery power consumption, radio use, processor/memory use) are optimized with a general philosophy for resource conservation while still optimizing performance and user experience. The host server 100 may also indirectly manage traffic via creation, selection and/or deployment of traffic blocking policy for implementation on the mobile device in some embodiments.

For example, in context of battery conservation, the device 150 can observe user activity (for example, by observing user keystrokes, backlight status, or other signals via one or more input mechanisms, etc.) and alters device 150 behaviors. The device 150 can also request the host server 100 to alter the behavior for network resource consumption based on user activity or behavior.

In one embodiment, the traffic management for resource conservation and/or maintaining of server stability in signaling optimization is performed using a distributed system between the host server 100 and client device 150. The distributed system can include proxy server and cache components on the server side 100 and on the device/client side, for example, as shown by the server cache 135 on the server 100 side and the local cache 185 on the client 150 side. In one embodiment, the traffic management for reducing signaling in the network and reducing or alleviating network congestion can be implemented on the mobile device 150 without any support from the server-side proxy or other network-side components.

Functions and techniques disclosed for context aware traffic management and providing server stability for resource conservation and reducing or optimizing signaling in networks (e.g., network 106 and/or 108) and devices 150, reside in a distributed proxy and cache system. The proxy and cache system can be distributed between, and reside on, a given client device 150 in part or in whole and/or host server 100 in part or in whole. The distributed proxy and cache system are illustrated with further reference to the example diagram shown in FIG. 1C. Functions and techniques performed by the proxy and cache components in the client device 150 and the related components therein are described, respectively, in detail with further reference to the examples of FIG. 2.

In one embodiment, client devices 150 communicate with the host server 100 and/or the application server 110 over network 106, which can be a cellular network and/or a broadband network. To facilitate overall traffic management between devices 150 and various application servers/content providers 110 to implement network (bandwidth utilization) and device resource (e.g., battery consumption), the host server 100 can communicate with the application server/providers 110 over the network 108, which can include the Internet (e.g., a broadband network).

In general, the networks 106 and/or 108, over which the client devices 150, the host server 100, and/or application server 110 communicate, may be a cellular network, a broadband network, a telephonic network, an open network, such as the Internet, or a private network, such as an intranet and/or the extranet, or any combination thereof. For example, the Internet can provide file transfer, remote log in, email, news, RSS, cloud-based services, instant messaging, visual voicemail, push mail, VoIP, and other services through any known or convenient protocol, such as, but is not limited to the TCP/IP protocol, UDP, HTTP, DNS, FTP, UPnP, NSF, ISDN, PDH, RS-232, SDH, SONET, etc.

The networks 106 and/or 108 include any collection of distinct networks operating wholly or partially in conjunction to provide connectivity to the client devices 150 and the host server 100 and may appear as one or more networks to the serviced systems and devices. In one embodiment, communications to and from the client devices 150 can be achieved by, an open network, such as the Internet, or a private network, broadband network, such as an intranet and/or the extranet. In one embodiment, communications can be achieved by a secure communications protocol, such as secure sockets layer (SSL), or transport layer security (TLS).

In addition, communications can be achieved via one or more networks, such as, but are not limited to, one or more of WiMax, a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), or any broadband network, and further enabled with technologies such as, by way of example, Global System for Mobile Communications (GSM), Personal Communications Service (PCS), Bluetooth, WiFi, Fixed Wireless Data, 2G, 2.5G, 3G (e.g., WCDMA/UMTS based 3G networks), 4G, IMT-Advanced, pre-4G, LTE Advanced, mobile WiMax, WiMax 2, WirelessMAN-Advanced networks, enhanced data rates for GSM evolution (EDGE), General packet radio service (GPRS), enhanced GPRS, iBurst, UMTS, HSPDA, HSUPA, HSPA, HSPA+, UMTS-TDD, 1xRTT, EV-DO, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks, broadband networks, or messaging protocols.

Figure 1C:
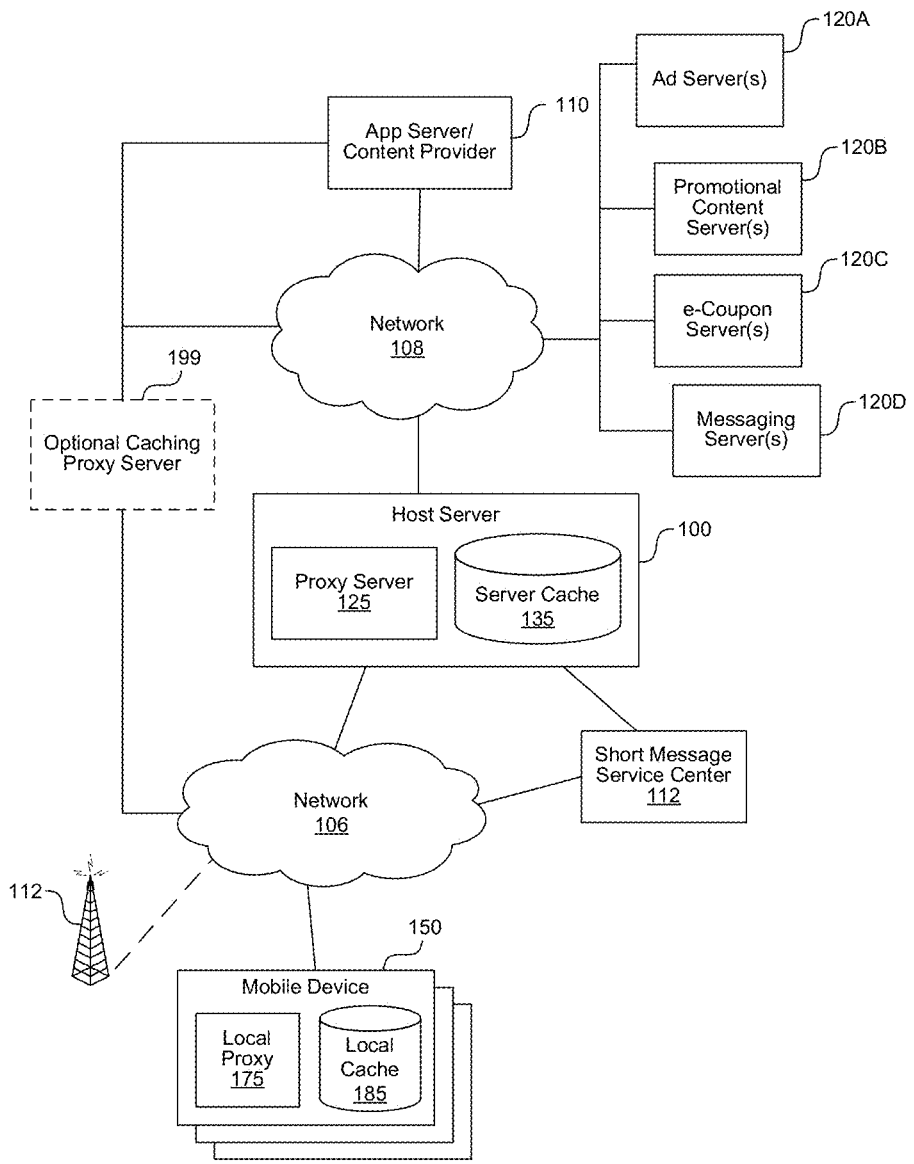
FIG. 1C illustrates an example diagram of a proxy and cache system distributed between the host server and device which facilitates network traffic management between a device, an application server or content provider, or other servers such as an ad server, promotional content server, an e-coupon server or messaging servers such as the GCM server and the EAS server for resource conservation and content caching. The proxy system distributed among the host server and the device can further optimize signaling in a mobile network and conserver battery resources based on transport protocol layer optimization techniques.

FIG. 1C illustrates an example diagram of a proxy and cache system distributed between the host server and device which facilitates network traffic management between a device, an application server or content provider, or other servers such as an ad server, promotional content server, an e-coupon server or messaging servers such as the GCM server and the EAS server for resource conservation and content caching. The distributed proxy system can further optimize signaling in a mobile network and conserver battery resources based on transport protocol layer optimization techniques.

The distributed proxy and cache system can include, for example, the proxy server 125 (e.g., remote proxy) and the server cache, 135 components on the server side. The server-side proxy 125 and cache 135 can, as illustrated, reside internal to the host server 100. In addition, the proxy server 125 and cache 135 on the server-side can be partially or wholly external to the host server 100 and in communication via one or more of the networks 106 and 108. For example, the proxy server 125 may be external to the host server and the server cache 135 may be maintained at the host server 100. Alternatively, the proxy server 125 may be within the host server 100 while the server cache is external to the host server 100. In addition, each of the proxy server 125 and the cache 135 may be partially internal to the host server 100 and partially external to the host server 100. The application server/content provider 110 can by any server including third party servers or service/content providers further including advertisement, promotional content, publication, or electronic coupon servers or services. Similarly, separate advertisement servers 120A, promotional content servers 120B, e-Coupon servers 120C, and/or messaging servers (e.g., GCM, EAS servers) 120D as application servers or content providers are illustrated by way of example.

The distributed system can also, include, in one embodiment, client-side components, including by way of example but not limitation, a local proxy 175 (e.g., a mobile client on a mobile device) and/or a local cache 185, which can, as illustrated, reside internal to the device 150 (e.g., a mobile device).

In addition, the client-side proxy 175 and local cache 185 can be partially or wholly external to the device 150 and in communication via one or more of the networks 106 and 108. For example, the local proxy 175 may be external to the device 150 and the local cache 185 may be maintained at the device 150. Alternatively, the local proxy 175 may be within the device 150 while the local cache 185 is external to the device 150. In addition, each of the proxy 175 and the cache 185 may be partially internal to the host server 100 and partially external to the host server 100.

In one embodiment, the distributed system can include an optional caching proxy server 199. The caching proxy server 199 can be a component which is operated by the application server/content provider 110, the host server 100, or a network service provider 112, and or any combination of the above to facilitate network traffic management for network and device resource conservation. Proxy server 199 can be used, for example, for caching content to be provided to the device 150, for example, from one or more of, the application server/provider 110, host server 100, and/or a network service provider 112. Content caching can also be entirely or partially performed by the remote proxy 125 to satisfy application requests or other data requests at the device 150.

In context aware traffic management and optimization for resource conservation and/or server stability in signaling optimization in a network (e.g., cellular or other wireless networks), characteristics of user activity/behavior and/or application behavior at a mobile device (e.g., any wireless device) 150 can be tracked by the local proxy 175 and communicated, over the network 106 to the proxy server 125 component in the host server 100, for example, as connection metadata. The proxy server 125 which in turn is coupled to the application server/provider 110 provides content and data to satisfy requests made at the device 150. The local proxy 175 can be a protocol agnostic component that can identify a pattern within a byte stream and perform a direct replay of the binary transactions in one embodiment. In another embodiment, the local proxy 175 can maintain or provide application and/or server stability for signaling optimization in a wireless network utilizing proprietary and/or non-proprietary protocols.

In addition, the local proxy 175 can identify and retrieve mobile device properties, including one or more of, battery level, network that the device is registered on, radio state, signal strength, cell identifier (i.e., cell ID), location area code, or whether the mobile device is being used (e.g., interacted with by a user). In some instances, the local proxy 175 can delay, expedite (prefetch), and/or modify data prior to transmission to the proxy server 125, when appropriate, as will be further detailed with references to the description associated with the examples of FIG. 2.

The local database 185 can be included in the local proxy 175 or coupled to the local proxy 175 and can be queried for a locally stored response to the data request prior to the data request being forwarded on to the proxy server 125. Locally cached responses can be used by the local proxy 175 to satisfy certain application requests of the mobile device 150, by retrieving cached content stored in the cache storage 185, when the cached content is still valid.

Similarly, the proxy server 125 of the host server 100 can also delay, expedite, or modify data from the local proxy prior to transmission to the content sources (e.g., the application server/content provider 110). In addition, the proxy server 125 uses device properties and connection metadata to generate rules for satisfying request of applications on the mobile device 150. The proxy server 125 can gather real time traffic information about requests of applications for later use in optimizing similar connections with the mobile device 150 or other mobile devices. The proxy server 125 can further aggregate reports on detection of congestion from multiple mobile devices to provide reports on congestion distribution and timing patterns and other information to operators of the networks.

In general, the local proxy 175 and the proxy server 125 are transparent to the multiple applications executing on the mobile device. The local proxy 175 is generally transparent to the operating system or platform of the mobile device and may or may not be specific to device manufacturers. In some instances, the local proxy 175 is optionally customizable in part or in whole to be device specific. In some embodiments, the local proxy 175 may be bundled into a wireless model, a firewall, and/or a router.

In one embodiment, the host server 100 can in some instances, utilize the store and forward functions of a short message service center (SMSC) 112, such as that provided by the network service provider, in communicating with the device 150 in achieving network traffic management. Note that SMSC 112 can also utilize any other type of alternative channel including USSD or other network control mechanisms. The host server 100 can forward content or HTTP responses to the SMSC 112 such that it is automatically forwarded to the device 150 if available and for subsequent forwarding if the device 150 is not currently available.

In general, the disclosed distributed proxy and cache system allows optimization of network usage, for example, by serving requests from the local cache 185, the local proxy 175 reduces the number of requests that need to be satisfied over the network 106. Further, the local proxy 175 and the proxy server 125 may filter irrelevant data from the communicated data. In addition, the local proxy 175 and the proxy server 125 can also accumulate low priority data and send it in batches to avoid the protocol overhead of sending individual data fragments. The local proxy 175 and the proxy server 125 can also compress or transcode the traffic, reducing the amount of data sent over the network 106 and/or 108. The signaling traffic in the network 106 and/or 108 can be reduced, as the networks are now used less often and the network traffic can be synchronized among individual applications. Further, by utilizing the transport protocol layer optimization techniques described above, signaling in the wireless network can be reduced, along with conservation of battery resources.

With respect to the battery life of the mobile device 150, by serving application or content requests from the local cache 185, the local proxy 175 can reduce the number of times the radio module is powered up. The local proxy 175 and the proxy server 125 can work in conjunction to accumulate low priority data and send it in batches to reduce the number of times and/or amount of time when the radio is powered up. The local proxy 175 can synchronize the network use by performing the batched data transfer for all connections simultaneously. Furthermore, by preventing the mobile device from constantly attempting to signal the network that is congested, and/or allowing selective (e.g., high priority traffic) towards the network, the local proxy 175 can conserve battery resources of the mobile device.

Figure 1D:
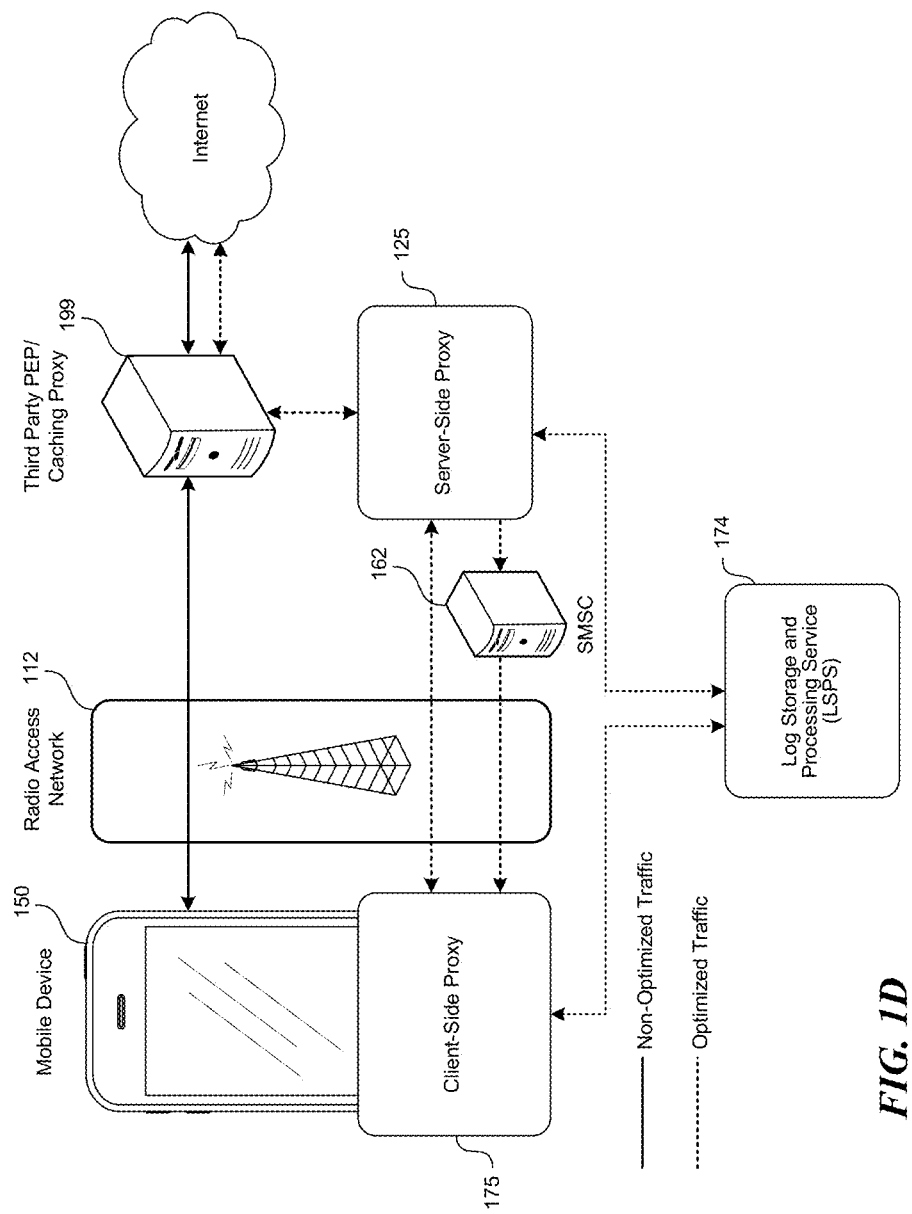
FIG. 1D illustrates an example diagram of the logical architecture of a distributed proxy and cache system.

FIG. 1D illustrates an example diagram of the logical architecture of a distributed proxy and cache system. The distributed system can include, for example the following components:

Client Side Proxy 175: a component installed in a smartphone, mobile device or wireless device 150 that interfaces with device's operating system, as well as with data services and applications installed in the device. The client side proxy 175 is typically compliant with and able to operate with standard or state of the art networking protocols. Additional components and features of the client-side proxy 175 are illustrated with further references to the examples of FIG. 2.

The server side proxy 125 can include one or more servers that can interface with third party application servers (e.g., 199), mobile operator's network (which can be proxy 199 or an additional server that is not illustrated) and/or the client side proxy 175. In general, the server side proxy 125 can be compliant with and is generally able to operate with standard or state of the art networking protocols and/or specifications for interacting with mobile network elements and/or third party servers. Some components and features of the server-side proxy 125 are illustrated with further references to the examples of FIG. 1F.

Log Storage and Processing Service (LSPS) 174: The log storage and processing service, server, system or component 174 can provide reporting and usage analytics services. The LSPS 174 can collect information (e.g., logs) from the client side 175 and/or the server side 125 and provide the necessary tools for producing reports and usage analytics can used for analyzing traffic and signaling data. The client logs (e.g., logs on the client device 150 aggregated by the local proxy 175) are stored in the device until a data channel is activated, and then are transferred in binary format to the LSPS 174. In one embodiment, the logs are processed using log processing tools provided by the LSPS 174. The processed logs are subsequently stored in a distributed database. The logs may be used for reporting as well as for troubleshooting issues. For example, analytics from the logs can be used by the proxy system in managing, reducing or optimizing network traffic or by the network operator in monitoring their networks for possible improvements and enhancements. Note that LSPS 174 as illustrated, may be a server separate from the server-side proxy 125, or it may be a component of the server-side proxy 125, residing partially or wholly therein.

In one implementation, the level of logging (e.g., types of data to be logged, and the like) can be specified using configuration settings in the client-side proxy 175 and/or the server-side proxy 125. Various data relating to bytes and transactions, network connectivity, power, subscriber count, and the like may be logged, and/or processed using default (or another) settings on a periodic (e.g., hourly, daily, and the like) basis.

Bytes and Transactions data may include a number of bytes transacted (both to and from), total number of transactions between the client-side proxy 175 and each application, the client-side proxy 175 and the network (e.g., radio access network 112), the client-side proxy 175 and its cache, and the like. Network Connectivity data may include, for example, total time the device spends in "data connected" state (based on a two-state connectivity model), total number of transitions into the data connected state, the number of times the radio transitions into the data connected state due to a network request that was proxied through the client-side proxy 175, total time spent in the data connected state due to a network request that was proxied through the client-side proxy 175 the number of transitions into data connected mode saved by the client-side and/or server-side proxy system, the amount of time in data connected state saved by the client-side and/or server-side proxy system, simulated values for the previous four items, as if traffic proxied via client-side and/or server-side proxy system were the only traffic on the device. Network connectivity data can also include the amount of time taken to transition from an idle state to connected state (i.e., setup time), a baseline or a reference determined from a sample of setup times, and the like. Power related data may include, for example, each one-percent (or any other percentage value) change in the battery level, the total time the device is powered on but not connected to a power source, and the like. Subscriber count data may include, for example, the number of new subscribers observed in a period and the number of active subscribers in the period. This data may be aggregated by the host server, for example. Reporting of the above data can be done based on variables such as network bearer type (e.g., all, mobile or Wi-Fi), category (e.g., all, device model or application name), time (e.g., hour, day or month), and the like, or combinations thereof.

Figure 1E:
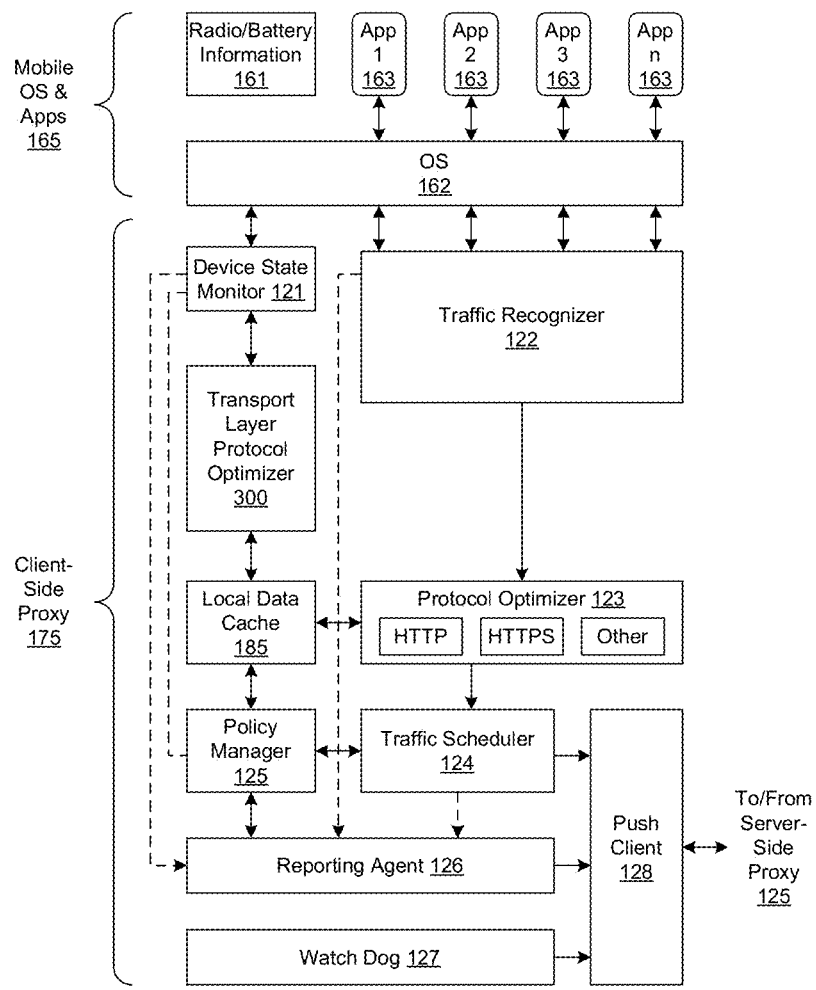
FIG. 1E illustrates an example diagram showing the architecture of client side components in a distributed proxy and cache system having one or more components for optimizing signaling in a mobile network and conserving battery resources based on transport protocol layer optimization techniques.

FIG. 1E illustrates an example diagram showing the architecture of client-side components in a distributed proxy and cache system, including transport protocol layer optimizer 300.

The client side proxy components 175 can include software components or agents installed on the mobile device that enables traffic optimization and performs the related functionalities on the client side. Components of the client side proxy 175 can operate transparently for end users and applications 163, and interface with the device's operating system (OS) 162. The client side proxy 175 can be installed on mobile devices for optimization to take place, and it can effectuate changes on the data routes and/or timing. Once data routing is modified, the client side proxy 175 can respond to application requests to service providers or host servers, in addition to or instead of letting those applications 163 access data network directly. In general, applications 163 on the mobile device will not notice that the client side proxy 175 is responding to their requests.

Some example components of the client side proxy 175 are described as follows:

Device State Monitor 121: The device state monitor 121 can be responsible for identifying several states and metrics in the device, such as network status, display status, battery level (e.g., via the radio/battery information 161), etc., such that the remaining components in the client side proxy 175 can operate and make decisions according to device state, acting in an optimal way in each state.

Traffic Recognizer 122: The traffic recognizer 122 analyzes all traffic between the wireless device applications 163 and their respective host servers in order to identify recurrent patterns. Supported transport protocols include, for example, DNS, HTTP and HTTPS, such that traffic through those ports is directed to the client side proxy 175. While analyzing traffic, the client side proxy 175 can identify recurring polling patterns which can be candidates to be performed remotely by the server side proxy 125, and send to the protocol optimizer 123.

Protocol Optimizer 123: The protocol optimizer 123 can implement the logic of serving recurrent request from the local cache 185 instead of allowing those request go over the network to the service provider/application host server. One is its tasks is to eliminate or minimize the need to send requests to the network, positively affecting network congestion and device battery life.

Local Cache 185: The local cache 185 can store responses to recurrent requests, and can be used by the Protocol Optimizer 123 to send responses to the applications 163.

Traffic Scheduler 124: The traffic scheduler 124 can temporally move communications to optimize usage of device resources by unifying keep-alive signaling so that some or all of the different applications 163 can send keep-alive messages at the same time (traffic pipelining). Traffic scheduler 124 may also decide to delay transmission of data that is not relevant at a given time (for example, when the device is not actively used).

Policy Manager 125: The policy manager 125 can store and enforce traffic optimization and reporting policies provisioned by a Policy Management Server (PMS). At the client side proxy 175 first start, traffic optimization and reporting policies (policy profiles) that is to be enforced in a particular device can be provisioned by the Policy Management Server. Enforcing traffic management policies at the device's IP later lets an operator manage traffic before it uses radio accessed network resources. Policy usage can range from creating highly targeted subscriber plans to proactively and/or reactively managing network congestion. In one implementation, the conditions for selecting a policy for enforcement, and/or conditions for dropping an implemented policy may be managed or coordinated by the policy manager 125.

Watch Dog 127: The watch dog 127 can monitor the client side proxy 175 operating availability. In case the client side proxy 175 is not working due to a failure or because it has been disabled, the watchdog 127 can reset DNS routing rules information and can restore original DNS settings for the device to continue working until the client side proxy 175 service is restored.

Reporting Agent 126: The reporting agent 126 can gather information (e.g., logs) about the events taking place in the device and sends the information to the log storage and processing service 174, which collects and stores client-side and/or server-side proxy system logs. Event details are stored temporarily in the device and transferred to log storage and processing service 174 only when the data channel state is active. If the client side proxy 175 does not send records within a period of time (e.g., twenty-four hours), the reporting agent 126 may, in one embodiment, attempt to open the connection and send recorded entries or, in case there are no entries in storage, an empty reporting packet. All reporting settings may be configured in the policy management server. The information in the logs may be used for reporting and/or troubleshooting, for example.

Push Client 128: The push client 128 can be responsible for the traffic to between the server side proxy 125 and the client side proxy 175. The push client 128 can send out service requests like content update requests and policy update requests, and receives updates to those requests from the server side proxy 125. In addition, push client 128 can send data to a log storage and processing service 176, which may be internal to or external to the server side proxy 125.

The proxy server 199 has a wide variety of uses, from speeding up a web server by caching repeated requests, to caching web, DNS and other network lookups for a group of clients sharing network resources. The proxy server 199 is optional. The distributed proxy and cache system (125 and/or 175) allows for a flexible proxy configuration using either the proxy 199, additional proxy(s) in operator's network, or integrating both proxies 199 and an operator's or other third-party's proxy.

Transport Layer Protocol Optimizer 300 implements one or more transport protocol layer optimization techniques to reduce signaling in the mobile network and reduce battery drain on the mobile device. Various aspects of the transport layer protocol optimizer 300 are described in detail with reference to FIG. 3.

Figure 1F:
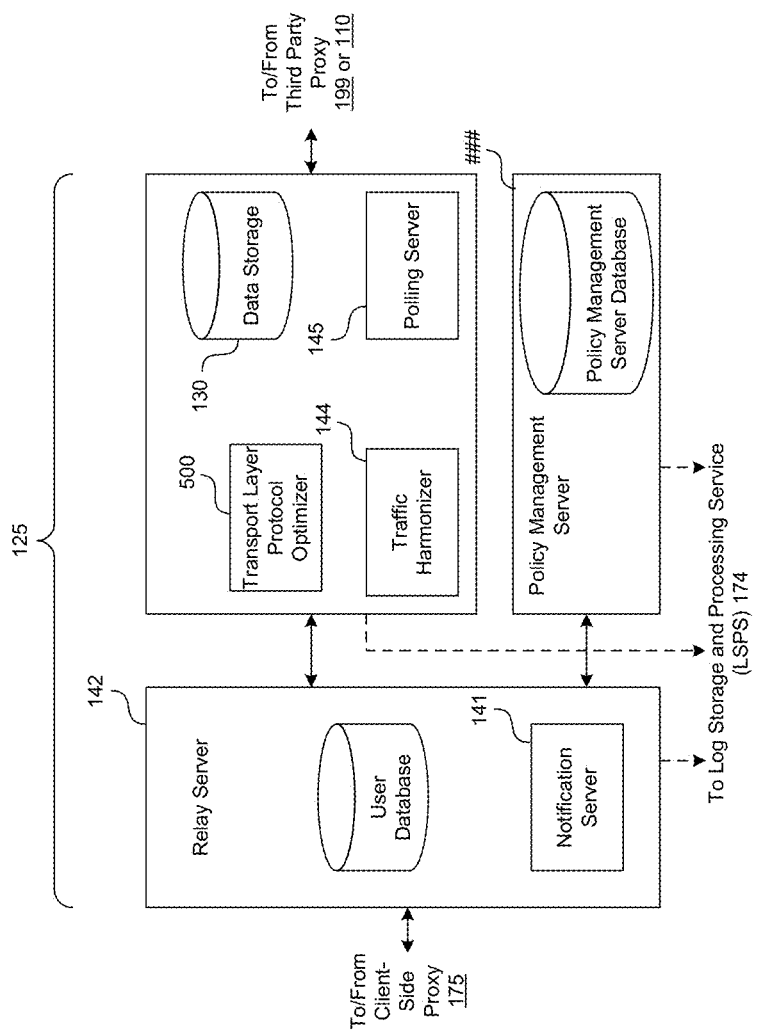
FIG. 1F illustrates a diagram of the example components on the server side of the distributed proxy and cache system.
Figure 2:
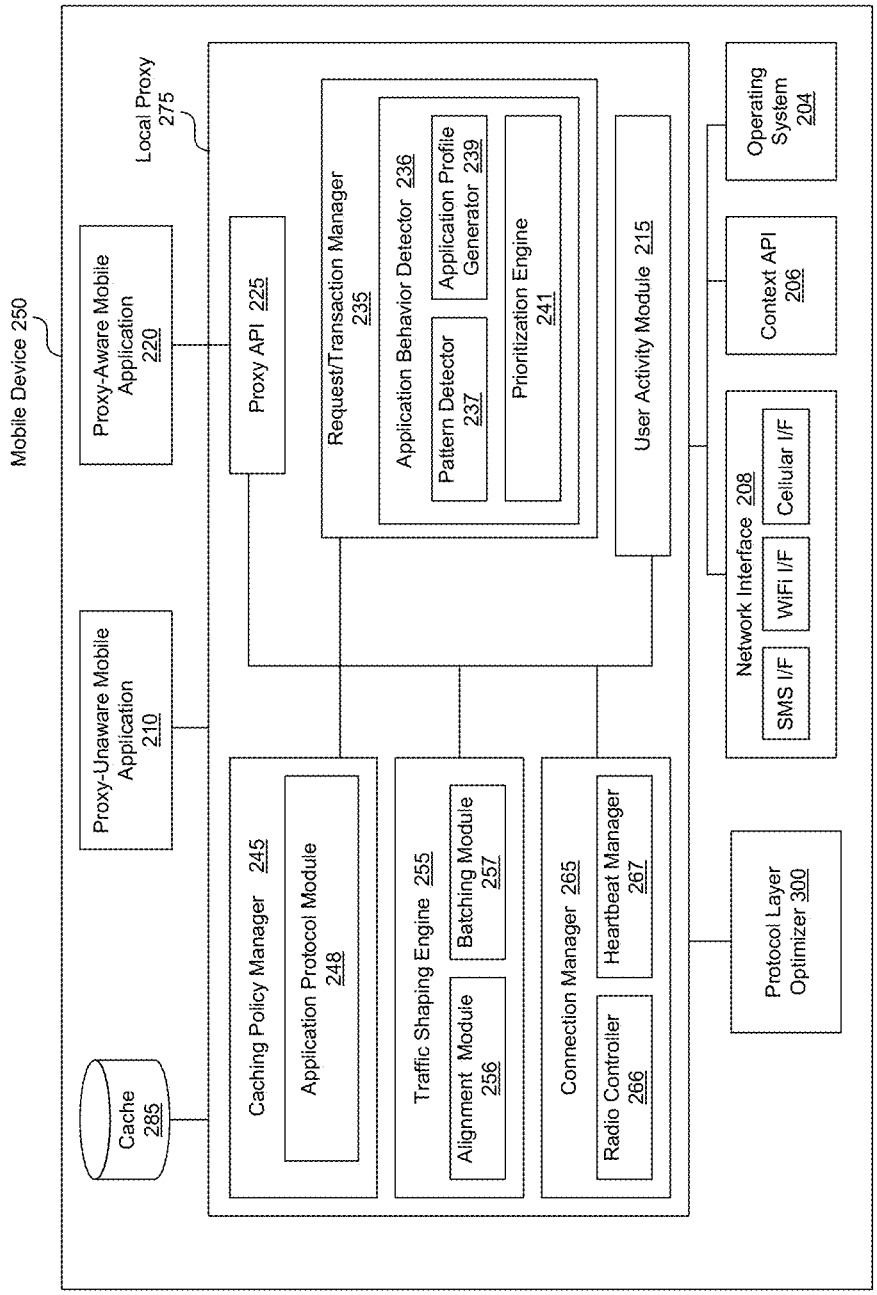
Figure 3:
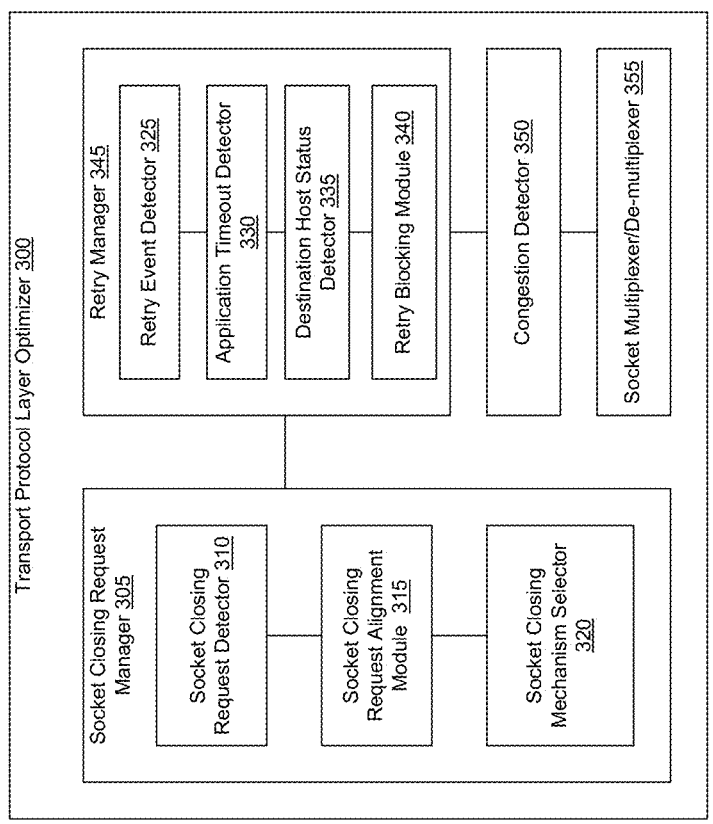
Figure 4:
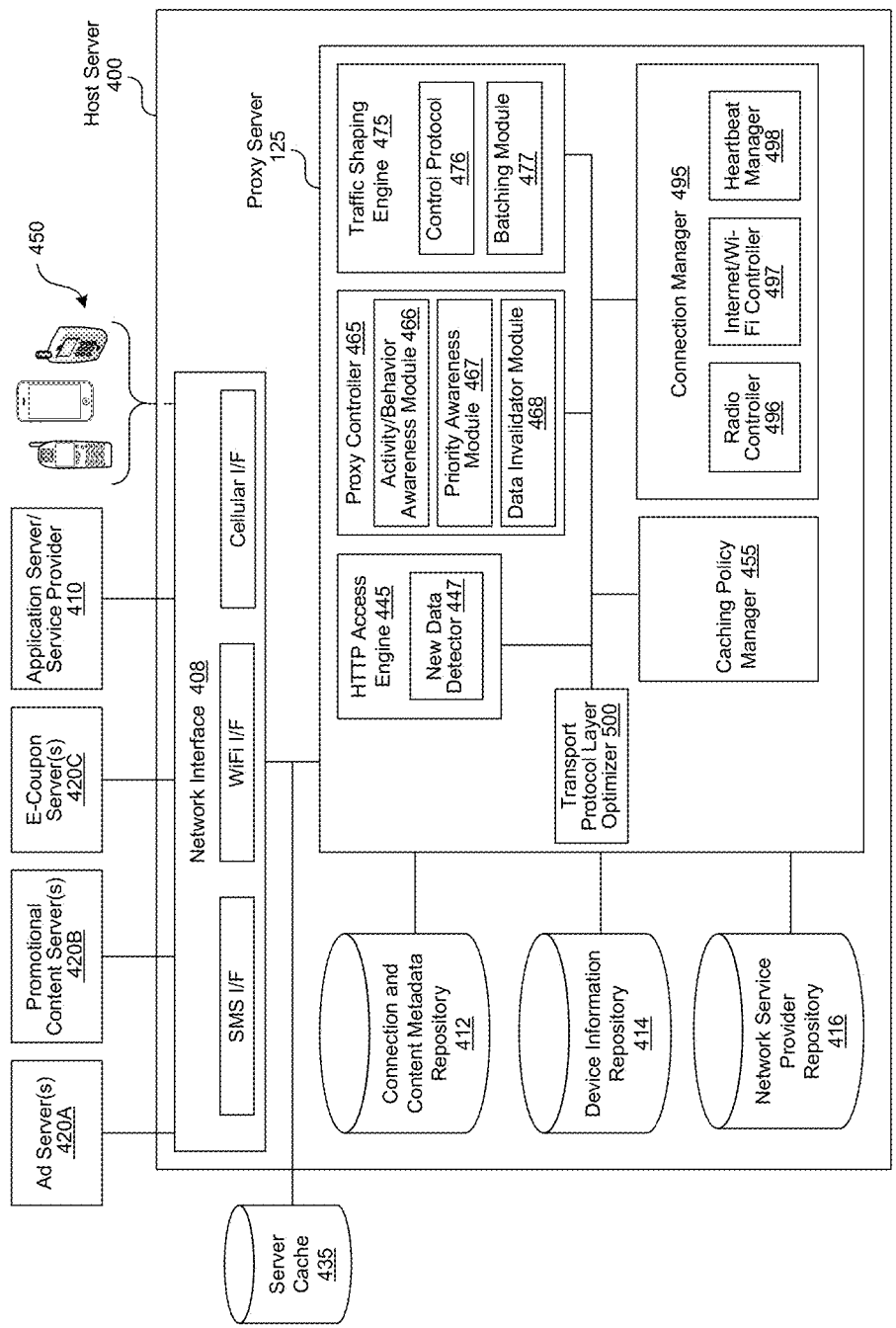
Figure 5:
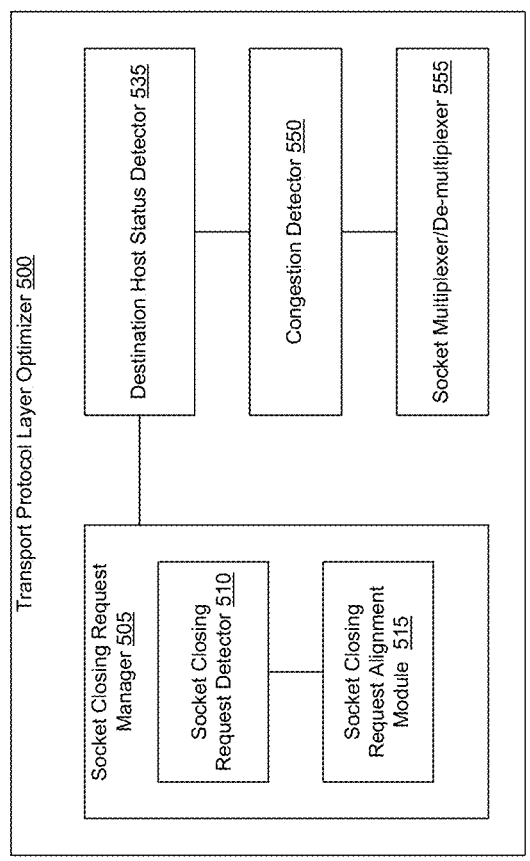
Figure 6:
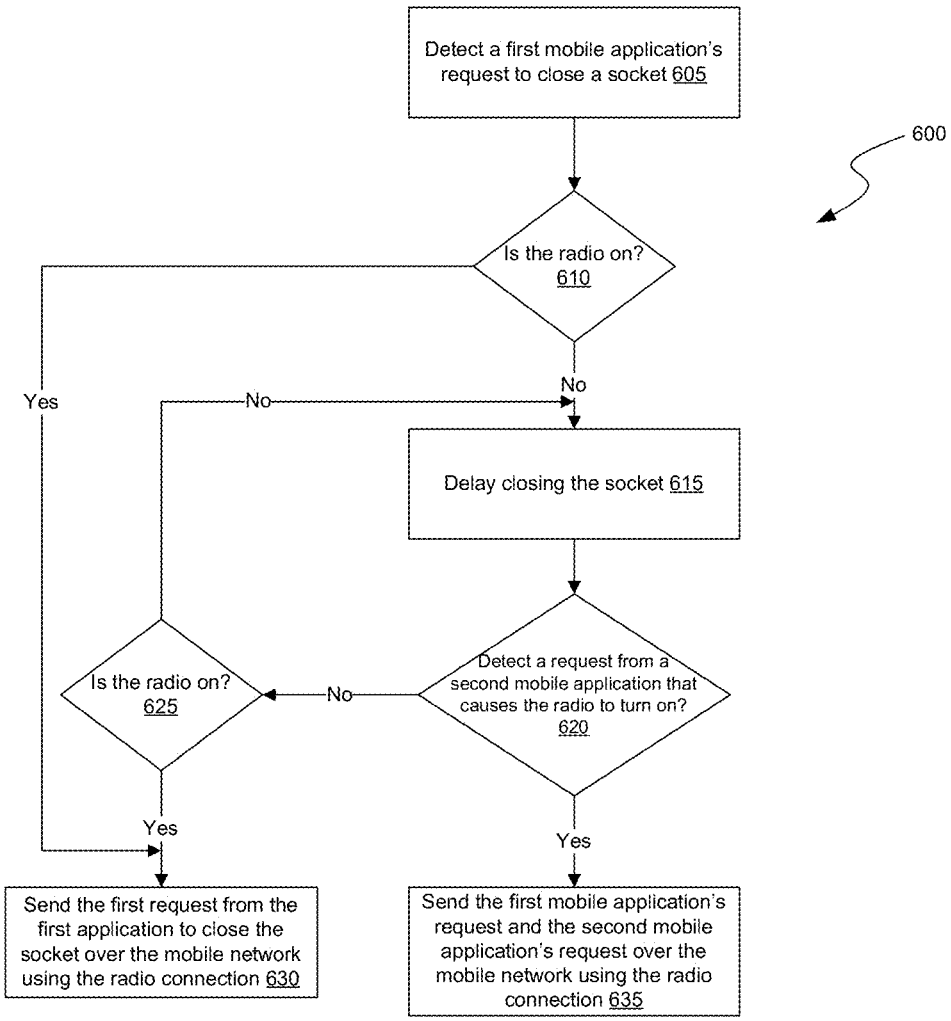

FIG. 1F illustrates a diagram of the example components on the server side of the distributed proxy and cache system.

The server side 125 of the distributed system can include, for example a relay server 142, which interacts with a traffic harmonizer 144, a polling server 145 and/or a policy management server 143. Each of the various components can communicate with the client side proxy 175, or other third party (e.g., application server/service provider 110 and/or other proxy 199) and/or a reporting and usage analytics system. Some example components of the server side proxy 125 is described as follows:

Relay Server 142: The relay server 142 is the routing agent in the distributed proxy architecture. The relay server 142 manages connections and communications with components on the client-side proxy 175 installed on devices and provides an administrative interface for reports (e.g., congestion reports), provisioning, platform setup, and so on.

Notification Server 141: The notification server 141 is a module able to connect to an operator's SMSC gateways and deliver SMS notifications to the client-side proxy 175. SMS notifications can be used when an IP link is not currently active, in order to avoid the client-side proxy 175 from activating a connection over the wireless data channel, thus avoiding additional signaling traffic. However, if the IP connection happens to be open for some other traffic, the notification server 141 can use it for sending the notifications to the client-side proxy 175. The user database can store operational data including endpoint (MSISDN), organization and Notification server 141 gateway for each resource (URIs or URLs).

Traffic Harmonizer 144: The traffic harmonizer 144 can be responsible for communication between the client-side proxy 175 and the polling server 145. The traffic harmonizer 144 connects to the polling server 145 directly or through the data storage 130, and to the client over any open or proprietary protocol such as the 7TP, implemented for traffic optimization. The traffic harmonizer 144 can be also responsible for traffic pipelining on the server side: if there's cached content in the database for the same client, this can be sent over to the client in one message.

Polling Server 145: The polling server 145 can poll third party application servers on behalf of applications that are being optimized). If a change occurs (i.e. new data available) for an application, the polling server 145 can report to the traffic harmonizer 144 which in turn sends a notification message to the client-side proxy 175 for it to clear the cache and allow application to poll application server directly.

Policy Management Server 143: The policy management server (PMS) 143 allows administrators to configure and store policies for the client-side proxies 175 (device clients). It also allows administrators to notify the client-side proxies 175 about policy changes. Using the policy management server 143, each operator can configure the policies to work in the most efficient way for the unique characteristics of each particular mobile operator's network.

Log Storage and Processing Service 174: The log storage and processing service 174 collects information (e.g., logs) from the client side 175 and/or from the server side 125, and provides the tools for analyzing and producing reports and usage analytics that operators can use for analyzing application signaling, data consumption, congestion, and the like.

Transport Layer Protocol Optimizer 500: The transport layer protocol optimizer 500 facilitates signaling optimization from the server-side by providing response to server initiated socket closures, de-multiplexing multiple requests directed to different application servers received over the same TCP socket, etc. Various aspects of the transport layer protocol optimizer 500 are described in detail with reference to FIG. 5.

FIG. 2 illustrates a block diagram depicting an example of client-side components in a distributed proxy and cache system, further including a transport protocol layer optimizer 300 for optimizing signaling in a wireless network and conserving battery resources based on transport protocol layer optimization techniques.

A device 250, which can be a portable or mobile device (e.g., any wireless device), such as a portable phone, generally includes, for example, a network interface 208, an operating system 204, a context API 206, and mobile applications which may be proxy-unaware 210 or proxy-aware 220. Note that the device 250 is specifically illustrated in the example of FIG. 2 as a mobile device, such is not a limitation and that device 250 may be any wireless, broadband, portable/mobile or non-portable device able to receive, transmit signals to satisfy data requests over a network including wired or wireless networks (e.g., Wi-Fi, cellular, Bluetooth, LAN, WAN, and the like).

The network interface 208 can be a networking module that enables the device 250 to mediate data in a network with an entity that is external to the host server 250, through any known and/or convenient communications protocol supported by the host and the external entity. The network interface 208 can include one or more of a network adaptor card, a wireless network interface card (e.g., SMS interface, Wi-Fi interface, interfaces for various generations of mobile communication standards including but not limited to 2G, 3G, 3.5G, 4G, LTE, and the like), Bluetooth, or whether or not the connection is via a router, an access point, a wireless router, a switch, a multilayer switch, a protocol converter, a gateway, a bridge, a bridge router, a hub, a digital media receiver, and/or a repeater.

Device 250 can further include, client-side components of the distributed proxy and cache system which can include, a local proxy 275 (e.g., a mobile client of a mobile device) and a cache 285. In one embodiment, the local proxy 275 includes a user activity module 215, a proxy API 225, a request/transaction manager 235, a caching policy manager 245 having an application protocol module 248, a traffic shaping engine 255, and/or a connection manager 265. The traffic shaping engine 255 may further include an alignment module 256 and/or a batching module 257, the connection manager 265 may further include a radio controller 266 and a heartbeat manager 267. The request/transaction manager 235 can further include an application behavior detector 236 and/or a prioritization engine 241, the application behavior detector 236 may further include a pattern detector 237 and/or and application profile generator 239. Device 250 can also include protocol layer optimization components 470 which can implement the disclosed transport protocol layer optimization techniques to optimize signaling traffic in the wireless network and conserve battery resources. Additional or less components/modules/engines can be included in the local proxy 275 and each illustrated component.

In one embodiment, a portion of the distributed proxy and cache system for network traffic management resides in or is in communication with device 250, including local proxy 275 (mobile client) and/or cache 285. The local proxy 275 can provide an interface on the device 250 for users to access device applications and services including email, IM, voice mail, visual voicemail, feeds, Internet, games, productivity tools, or other applications, etc.

The proxy 275 is generally application independent and can be used by applications (e.g., both proxy-aware and proxy-unaware applications 210 and 220 and other mobile applications) to open TCP connections to a remote server (e.g., the server 100 in the examples of FIGS. 1B-1C and/or server proxy 125 shown in the examples of FIG. 1C. In some instances, the local proxy 275 includes a proxy API 225 which can be optionally used to interface with proxy-aware applications 220 (or applications (e.g., mobile applications) on a mobile device (e.g., any wireless device)).

The applications 210 and 220 can generally include any user application, widgets, software, HTTP-based application, web browsers, video or other multimedia streaming or downloading application, video games, social network applications, email clients, RSS management applications, application stores, document management applications, productivity enhancement applications, and the like. The applications can be provided with the device OS, by the device manufacturer, by the network service provider, downloaded by the user, or provided by others.

One embodiment of the local proxy 275 includes or is coupled to a context API 206, as shown. The context API 206 may be a part of the operating system 204 or device platform or independent of the operating system 204, as illustrated. The operating system 204 can include any operating system including but not limited to, any previous, current, and/or future versions/releases of, Windows Mobile, iOS, Android, Symbian, Palm OS, Brew MP, Java 2 Micro Edition (J2ME), Blackberry, etc.

The context API 206 may be a plug-in to the operating system 204 or a particular client/application on the device 250. The context API 206 can detect signals indicative of user or device activity, for example, sensing motion, gesture, device location, changes in device location, device backlight, keystrokes, clicks, activated touch screen, mouse click or detection of other pointer devices. The context API 206 can be coupled to input devices or sensors on the device 250 to identify these signals. Such signals can generally include input received in response to explicit user input at an input device/mechanism at the device 250 and/or collected from ambient signals/contextual cues detected at or in the vicinity of the device 250 (e.g., light, motion, piezoelectric, etc.).

In one embodiment, the user activity module 215 interacts with the context API 206 to identify, determine, infer, detect, compute, predict, and/or anticipate, characteristics of user activity on the device 250. Various inputs collected by the context API 206 can be aggregated by the user activity module 215 to generate a profile for characteristics of user activity. Such a profile can be generated by the user activity module 215 with various temporal characteristics. For instance, user activity profile can be generated in real-time for a given instant to provide a view of what the user is doing or not doing at a given time (e.g., defined by a time window, in the last minute, in the last 30 seconds, etc.), a user activity profile can also be generated for a 'session' defined by an application or web page that describes the characteristics of user behavior with respect to a specific task they are engaged in on the device 250, or for a specific time period (e.g., for the last 2 hours, for the last 5 hours).

Additionally, characteristic profiles can be generated by the user activity module 215 to depict a historical trend for user activity and behavior (e.g., 1 week, 1 mo., 2 mo., etc.). Such historical profiles can also be used to deduce trends of user behavior, for example, access frequency at different times of day, trends for certain days of the week (weekends or week days), user activity trends based on location data (e.g., IP address, GPS, or cell tower coordinate data) or changes in location data (e.g., user activity based on user location, or user activity based on whether the user is on the go, or traveling outside a home region, etc.) to obtain user activity characteristics.

In one embodiment, user activity module 215 can detect and track user activity with respect to applications, documents, files, windows, icons, and folders on the device 250. For example, the user activity module 215 can detect when an application or window (e.g., a web browser or any other type of application) has been exited, closed, minimized, maximized, opened, moved into the foreground, or into the background, multimedia content playback, etc.

In one embodiment, characteristics of the user activity on the device 250 can be used to locally adjust behavior of the device (e.g., mobile device or any wireless device) to optimize its resource consumption such as battery/power consumption and more generally, consumption of other device resources including memory, storage, and processing power, and/or further optimize signaling in the network. In one embodiment, the use of a radio on a device can be adjusted based on characteristics of user behavior (e.g., by the radio controller 266 of the connection manager 265) coupled to the user activity module 215. For example, the radio controller 266 can turn the radio on or off, based on characteristics of the user activity on the device 250. In addition, the radio controller 266 can adjust the power mode of the radio (e.g., to be in a higher power mode or lower power mode) depending on characteristics of user activity.

In one embodiment, characteristics of the user activity on device 250 can also be used to cause another device (e.g., other computers, a mobile device, a wireless device, or a non-portable device) or server (e.g., host server 100 in the examples of FIG. 1A-1B) which can communicate (e.g., via a cellular or other network) with the device 250 to modify its communication frequency with the device 250. The local proxy 275 can use the characteristics information of user behavior determined by the user activity module 215 to instruct the remote device as to how to modulate its communication frequency (e.g., decreasing communication frequency, such as data push frequency if the user is idle, requesting that the remote device notify the device 250 if new data, changed, data, or data of a certain level of importance becomes available, etc.).

In one embodiment, the user activity module 215 can, in response to determining that user activity characteristics indicate that a user is active after a period of inactivity, request that a remote device (e.g., server host server 100 in the examples of FIGS. 1B-1C) send the data that was buffered as a result of the previously decreased communication frequency.

In addition, or in alternative, the local proxy 275 can communicate the characteristics of user activity at the device 250 to the remote device (e.g., host server 100 in the examples of FIGS. 1B-1C) and the remote device determines how to alter its own communication frequency with the device 250 for network resource conservation and conservation of device 250 resources.

One embodiment of the local proxy 275 further includes a request/transaction manager 235, which can detect, identify, intercept, process, manage, data requests initiated on the device 250, for example, by applications 210 and/or 220, and/or directly/indirectly by a user request. The request/transaction manager 235 can determine how and when to process a given request or transaction, or a set of requests/transactions, based on transaction characteristics.

The request/transaction manager 235 can prioritize requests or transactions made by applications and/or users at the device 250, for example by the prioritization engine 241. Importance or priority of requests/transactions can be determined by the request/transaction manager 235 by applying a rule set, for example, according to time sensitivity of the transaction, time sensitivity of the content in the transaction, time criticality of the transaction, time criticality of the data transmitted in the transaction, and/or time criticality or importance of an application making the request.

In addition, transaction characteristics can also depend on whether the transaction was a result of user-interaction or other user-initiated action on the device (e.g., user interaction with an application (e.g., a mobile application)). In general, a time critical transaction can include a transaction resulting from a user-initiated data transfer, and can be prioritized as such. Transaction characteristics can also depend on the amount of data that will be transferred or is anticipated to be transferred as a result of the requested transaction. For example, the connection manager 265, can adjust the radio mode (e.g., high power or low power mode via the radio controller 266) based on the amount of data that will need to be transferred.

In addition, the radio controller 266/connection manager 265 can adjust the radio power mode (high or low) based on time criticality/sensitivity of the transaction. The radio controller 266 can trigger the use of high power radio mode when a time-critical transaction (e.g., a transaction resulting from a user-initiated data transfer, an application running in the foreground, any other event meeting a certain criteria) is initiated or detected.

In general, the priorities can be set by default, for example, based on device platform, device manufacturer, operating system, etc. Priorities can alternatively or in additionally be set by the particular application; for example, the social networking application (e.g., a mobile application) can set its own priorities for various transactions (e.g., a status update can be of higher priority than an add friend request or a poke request, a message send request can be of higher priority than a message delete request, for example), an email client or IM chat client may have its own configurations for priority. The prioritization engine 241 may include set of rules for assigning priority.

The prioritization engine 241 can also track network provider limitations or specifications on application or transaction priority in determining an overall priority status for a request/transaction. Furthermore, priority can in part or in whole be determined by user preferences, either explicit or implicit. A user, can in general, set priorities at different tiers, such as, specific priorities for sessions, or types, or applications (e.g., a browsing session, a gaming session, versus an IM chat session, the user may set a gaming session to always have higher priority than an IM chat session, which may have higher priority than web-browsing session). A user can set application-specific priorities, (e.g., a user may set social networking-related transactions to have a higher priority than LinkedIn-related transactions), for specific transaction types (e.g., for all send message requests across all applications to have higher priority than message delete requests, for all calendar-related events to have a high priority, etc.), and/or for specific folders.

The prioritization engine 241 can track and resolve conflicts in priorities set by different entities. For example, manual settings specified by the user may take precedence over device OS settings, network provider parameters/limitations (e.g., set in default for a network service area, geographic locale, set for a specific time of day, or set based on service/fee type) may limit any user-specified settings and/or application-set priorities. In some instances, a manual synchronization request received from a user can override some, most, or all priority settings in that the requested synchronization is performed when requested, regardless of the individually assigned priority or an overall priority ranking for the requested action.

Priority can be specified and tracked internally in any known and/or convenient manner, including but not limited to, a binary representation, a multi-valued representation, a graded representation and all are considered to be within the scope of the disclosed technology.

TABLE I

| Change (initiated on device) | Priority | Change (initiated on server) | Priority |
|---|---|---|---|
| Send email | High | Receive email | High |
| Delete email | Low | Edit email | Often not possible to sync (Low if possible) |
| (Un)read email | Low | | |
| Move message | Low | | |
| Read more | High | | |
| Download attachment | High | New email in deleted items | Low |
| New Calendar event | High | Delete an email | Low |
| Edit/change | High | (Un)Read an email | Low |
| Calendar event | | Move messages | Low |
| Add a contact | High | Any calendar change | High |
| Edit a contact | High | Any contact change | High |
| Search contacts | High | Wipe/lock device | High |
| Change a setting | High | Settings change | High |
| Manual send/receive | High | Any folder change | High |
| IM status change | Medium | Connector restart | High (if no changes nothing is sent) |
| Auction outbid or change notification | High | | |
| Weather Updates | Low | Social Network Status Updates | Medium |
| | | Severe Weather Alerts | High |
| | | News Updates | Low |

Table I above shows, for illustration purposes, some examples of transactions with examples of assigned priorities in a binary representation scheme. Additional assignments are possible for additional types of events, requests, transactions, and as previously described, priority assignments can be made at more or less granular levels, e.g., at the session level or at the application level, etc.

As shown by way of example in the above table, in general, lower priority requests/transactions can include, updating message status as being read, unread, deleting of messages, deletion of contacts; higher priority requests/transactions, can in some instances include, status updates, new IM chat message, new email, calendar event update/cancellation/deletion, an event in a mobile gaming session, or other entertainment related events, a purchase confirmation through a web purchase or online, request to load additional or download content, contact book related events, a transaction to change a device setting, location-aware or location-based events/transactions, or any other events/request/transactions initiated by a user or where the user is known to be, expected to be, or suspected to be waiting for a response, etc.

Inbox pruning events (e.g., email, or any other types of messages), are generally considered low priority and absent other impending events, generally will not trigger use of the radio on the device 250. Specifically, pruning events to remove old email or other content can be 'piggy backed' with other communications if the radio is not otherwise on, at the time of a scheduled pruning event. For example, if the user has preferences set to 'keep messages for 7 days old,' then instead of powering on the device radio to initiate a message delete from the device 250 the moment that the message has exceeded 7 days old, the message is deleted when the radio is powered on next. If the radio is already on, then pruning may occur as regularly scheduled.

The request/transaction manager 235, can use the priorities for requests (e.g., by the prioritization engine 241) to manage outgoing traffic from the device 250 for resource optimization (e.g., to utilize the device radio more efficiently for battery conservation). For example, transactions/requests below a certain priority ranking may not trigger use of the radio on the device 250 if the radio is not already switched on, as controlled by the connection manager 265. In contrast, the radio controller 266 can turn on the radio such a request can be sent when a request for a transaction is detected to be over a certain priority level.

In one embodiment, priority assignments (such as that determined by the local proxy 275 or another device/entity) can be used cause a remote device to modify its communication with the frequency with the mobile device or wireless device. For example, the remote device can be configured to send notifications to the device 250 when data of higher importance is available to be sent to the mobile device or wireless device.

In one embodiment, transaction priority can be used in conjunction with characteristics of user activity in shaping or managing traffic, for example, by the traffic shaping engine 255. For example, the traffic shaping engine 255 can, in response to detecting that a user is dormant or inactive, wait to send low priority transactions from the device 250, for a period of time. In addition, the traffic shaping engine 255 can allow multiple low priority transactions to accumulate for batch transferring from the device 250 (e.g., via the batching module 257). In one embodiment, the priorities can be set, configured, or readjusted by a user. For example, content depicted in Table I in the same or similar form can be accessible in a user interface on the device 250 and for example, used by the user to adjust or view the priorities.

The batching module 257 can initiate batch transfer based on certain criteria. For example, batch transfer (e.g., of multiple occurrences of events, some of which occurred at different instances in time) may occur after a certain number of low priority events have been detected, or after an amount of time elapsed after the first of the low priority event was initiated. In addition, the batching module 257 can initiate batch transfer of the cumulated low priority events when a higher priority event is initiated or detected at the device 250. Batch transfer can otherwise be initiated when radio use is triggered for another reason (e.g., to receive data from a remote device such as host server 100 or 300). In one embodiment, an impending pruning event (pruning of an inbox), or any other low priority events, can be executed when a batch transfer occurs.

In general, the batching capability can be disabled or enabled at the event/transaction level, application level, or session level, based on any one or combination of the following: user configuration, device limitations/settings, manufacturer specification, network provider parameters/limitations, platform-specific limitations/settings, device OS settings, etc. In one embodiment, batch transfer can be initiated when an application/window/file is closed out, exited, or moved into the background; users can optionally be prompted before initiating a batch transfer; users can also manually trigger batch transfers.

In one embodiment, the local proxy 275 locally adjusts radio use on the device 250 by caching data in the cache 285. When requests or transactions from the device 250 can be satisfied by content stored in the cache 285, the radio controller 266 need not activate the radio to send the request to a remote entity (e.g., the host server 100, 300, as shown in FIG. 1B or a content provider/application server such as the server/provider 110 shown in the examples of FIG. 1B and FIG. 1C). As such, the local proxy 275 can use the local cache 285 and the cache policy manager 245 to locally store data for satisfying data requests to eliminate or reduce the use of the device radio for conservation of network resources and device battery consumption.

In leveraging the local cache, once the request/transaction manager 225 intercepts a data request by an application on the device 250, the local repository 285 can be queried to determine if there is any locally stored response, and also determine whether the response is valid. When a valid response is available in the local cache 285, the response can be provided to the application on the device 250 without the device 250 needing to access the cellular network or wireless broadband network.

If a valid response is not available, the local proxy 275 can query a remote proxy (e.g., the server proxy) to determine whether a remotely stored response is valid. If so, the remotely stored response (e.g., which may be stored on the server cache 135 or optional caching server 199 shown in the example of FIG. 1C) can be provided to the mobile device, possibly without the mobile device 250 needing to access the cellular network, thus relieving consumption of network resources.

If a valid cache response is not available, or if cache responses are unavailable for the intercepted data request, the local proxy 275, for example, the caching policy manager 245, can send the data request to a remote proxy (e.g., server proxy 125 of FIG. 1C) which forwards the data request to a content source (e.g., application server/content provider 110 of FIG. 1B) and a response from the content source can be provided through the remote proxy. The cache policy manager 245 can manage or process requests that use a variety of protocols, including but not limited to HTTP, HTTPS, IMAP, POP, SMTP, XMPP, and/or ActiveSync. The caching policy manager 245 can locally store responses for data requests in the local database 285 as cache entries, for subsequent use in satisfying same or similar data requests.

The caching policy manager 245 can request that the remote proxy monitor responses for the data request and the remote proxy can notify the device 250 when an unexpected response to the data request is detected. In such an event, the cache policy manager 245 can erase or replace the locally stored response(s) on the device 250 when notified of the unexpected response (e.g., new data, changed data, additional data, etc.) to the data request. In one embodiment, the caching policy manager 245 is able to detect or identify the protocol used for a specific request, including but not limited to HTTP, HTTPS, IMAP, POP, SMTP, XMPP, and/or ActiveSync. In one embodiment, application specific handlers (e.g., via the application protocol module 246 of the caching policy manager 245) on the local proxy 275 allows for optimization of any protocol that can be port mapped to a handler in the distributed proxy (e.g., port mapped on the proxy server 125 in the example of FIG. 1C).

In one embodiment, the local proxy 275 notifies the remote proxy such that the remote proxy can monitor responses received for the data request from the content source for changed results prior to returning the result to the device 250, for example, when the data request to the content source has yielded same results to be returned to the mobile device. In general, the local proxy 275 can simulate application server responses for applications on the device 250, using locally cached content. This can prevent utilization of the cellular network for transactions where new/changed data is not available, thus freeing up network resources and preventing network congestion.

In one embodiment, the local proxy 275 includes an application behavior detector 236 to track, detect, observe, monitor, applications (e.g., proxy-aware and/or unaware applications 210 and 220) accessed or installed on the device 250. Application behaviors, or patterns in detected behaviors (e.g., via the pattern detector 237) of one or more applications accessed on the device 250 can be used by the local proxy 275 to optimize traffic in a wireless network needed to satisfy the data needs of these applications.

For example, based on detected behavior of multiple applications, the traffic shaping engine 255 can align content requests made by at least some of the applications over the network (wireless network) (e.g., via the alignment module 256). The alignment module 256 can delay or expedite some earlier received requests to achieve alignment. When requests are aligned, the traffic shaping engine 255 can utilize the connection manager to poll over the network to satisfy application data requests. Content requests for multiple applications can be aligned based on behavior patterns or rules/settings including, for example, content types requested by the multiple applications (audio, video, text, etc.), device (e.g., mobile or wireless device) parameters, and/or network parameters/traffic conditions, network service provider constraints/specifications, etc.

In one embodiment, the pattern detector 237 can detect recurrences in application requests made by the multiple applications, for example, by tracking patterns in application behavior. A tracked pattern can include, detecting that certain applications, as a background process, poll an application server regularly, at certain times of day, on certain days of the week, periodically in a predictable fashion, with a certain frequency, with a certain frequency in response to a certain type of event, in response to a certain type user query, frequency that requested content is the same, frequency with which a same request is made, interval between requests, applications making a request, or any combination of the above, for example.

Such recurrences can be used by traffic shaping engine 255 to offload polling of content from a content source (e.g., from an application server/content provider 110 of FIG. 1B) that would result from the application requests that would be performed at the mobile device or wireless device 250 to be performed instead, by a proxy server (e.g., proxy server 125 of FIG. 1C) remote from the device 250. Traffic shaping engine 255 can decide to offload the polling when the recurrences match a rule. For example, there are multiple occurrences or requests for the same resource that have exactly the same content, or returned value, or based on detection of repeatable time periods between requests and responses such as a resource that is requested at specific times during the day. The offloading of the polling can decrease the amount of bandwidth consumption needed by the mobile device 250 to establish a wireless (cellular or other wireless broadband) connection with the content source for repetitive content polls.

As a result of the offloading of the polling, locally cached content stored in the local cache 285 can be provided to satisfy data requests at the device 250, when content change is not detected in the polling of the content sources. As such, when data has not changed, application data needs can be satisfied without needing to enable radio use or occupying cellular bandwidth in a wireless network. When data has changed and/or new data has been received, the remote entity (e.g., the host server) to which polling is offloaded, can notify the device 250.

In one embodiment, the local proxy 275 can mitigate the need/use of periodic keep-alive messages (heartbeat messages) to maintain TCP/IP connections, which can consume significant amounts of power thus having detrimental impacts on mobile device battery life. The connection manager 265 in the local proxy (e.g., the heartbeat manager 267) can detect, identify, and intercept any or all heartbeat (keep-alive) messages being sent from applications.

The heartbeat manager 267 can prevent any or all of these heartbeat messages from being sent over the cellular, or other network, and instead rely on the server component of the distributed proxy system (e.g., shown in FIG. 1D) to generate and send the heartbeat messages to maintain a connection with the backend (e.g., application server/provider 110 in the example of FIG. 1B).

The local proxy 275 generally represents any one or a portion of the functions described for the individual managers, modules, and/or engines. The local proxy 275 and device 250 can include additional or less components; more or less functions can be included, in whole or in part, without deviating from the novel art of the disclosure.

FIG. 3 illustrates a block diagram depicting an example of one or more components of a transport protocol layer optimizer 300 for optimizing signaling in a mobile network and conserving battery resources based on transport protocol layer optimization techniques. In some embodiments, the transport protocol layer optimizer 300 can include a socket closing request manager 305 having a socket closing request detector 310, a socket closing request alignment module 315 and a socket closing mechanism selector 320, a retry manager 345 having a retry event detector 325, an application timeout detector 330, a destination host status detector 335 and a retry blocking module 340, a congestion detector 350 and a socket multiplexer/de-multiplexer 355. Additional or less components can be included in the transport protocol layer optimizer 300 in other embodiments.

The socket closing request manager 305 can detect socket closing requests, align at least some of the socket closing requests so that FINs related to socket closures can be sent using a radio connection established for sending or receiving other data on the mobile device. In some embodiments, the socket closing request detector 310 can receive, detect or intercept a first request from a first mobile application on the mobile device to close a connection (or socket) between the first mobile application and an application server associated with the first mobile application. The first request is received while a radio of the mobile device is turned off. To prevent the first request from causing the radio of the mobile device to turn on, the socket closing request alignment module 315 can delay the first request to close the connection until a second request which causes a radio connection to be established to the mobile network is received from a second mobile application on the mobile device. The second request can be detected by the request/transaction manager 235 and/or the radio state can be determined from the radio controller of the connection manager 266 as described with reference to FIG. 2. The first request to close the connection can be a Transport Control Protocol (TCP) FIN or a TCP RST, while the second request can be a request that is unrelated to closing a connection. For example, the second request can be a request for data initiated by a user of the mobile device or any other request that causes a promotion of the radio state to a connected or a higher powered state. Once the radio connection is established to send the second request, the socket request aligning module 315 can send the first request to close the connection using the same radio connection over which the second request is sent to the mobile network to reduce signaling in the mobile network.

In some embodiments, the socket closing request detector 310 can detect a request from a mobile application on the mobile device to close a network connection (or close a socket) over a mobile network with an application server. The socket closing request detector 310 can determine (e.g., via the congestion detector 350) if the mobile network is congested. The determination as to whether the mobile network is congested can be made based on calculations performed by the mobile device, based on information received from the radio access network or other remote entity, based on a number of retry attempts (e.g., more than 3 unsuccessful retry attempts to close the connection) or a combination thereof. Based on these information, the socket closing mechanism selector 320 can cause the network stack to utilize a second mechanism (e.g., TCP RST) instead of a first mechanism (e.g., TCP FIN) in closing the network connection when the mobile network is congested so as to prevent additional signaling in the mobile network. As previously described, the network stack can be a Transport Control Protocol (TCP) stack.

By closing the network connection using the TCP RST, the network stack avoids the need for the application server to send an acknowledgement to the mobile device and prevents the network stack from retrying to close the network connection if a prior attempt failed. A source of the additional signaling includes at least one of the network stack which can make multiple retry attempts to close the connection, a change in a radio state of the mobile device from an idle state to a connected state and/or the like. In some embodiments, the socket request closing mechanism selector 320 can also respond to the request from the mobile application to close the network connection in accordance with the first mechanism by sending a FIN-ACK and receiving an ACK in response.

In some embodiments, when a mobile application attempts to open a new socket in poor or congested network conditions, the TCP stack can keep retrying the SYN to open the socket with a back-off algorithm, even after the mobile application times out or the mobile application is no longer expecting a response. These retry attempts cause the radio on the mobile device to stay on or cause frequent radio state transitions, which causes signaling in the mobile networks and drains the battery resource on the mobile device. The retry manager 345 manages the retry attempts to optimize the signaling and resource consumption on the mobile network.

In some embodiments, the retry event detector 325 detects at least one attempt from a mobile application on the mobile device to establish a network connection over a mobile network with an application server. The application timeout detector 330 can detect when the mobile application has timed out. The destination host status detector 335 can detect that the application server or a host is unavailable or down. Based on at least one of the conditions, the retry blocking module 340 can prevent the TCP stack from making further attempts to establish the network connection to prevent additional signaling in the mobile network. For example, if a mobile application is attempting to establish a connection with the application server has timed out (i.e., is no longer waiting for a response), the retry blocking module 340 can block further attempts to establish a connection with the application server to save on signaling. Similarly, even if the mobile application has not timed out, but it is likely to not receive a response or is not expecting a response (e.g., because the application server is down or unavailable based on heartbeat manager 267 or other information) and/or the mobile network is congested, the retry blocking module 340 can block further attempts to establish a connection to the application server over the mobile network. In some embodiments, the retry blocking module 340, upon blocking retry attempts before the mobile application has timed out, can provide a response to the mobile application (e.g., SYN-ACK) to prevent the TCP stack from retrying to establish the network connection.

In some embodiments, the socket multiplexer/de-multiplexer 355 can multiplex all TCP sockets in the mobile device through a single socket over the network. In other words, instead of opening a dedicated TCP socket for each mobile application, a single TCP socket can be opened and used to multiplex data requests from multiple applications to a proxy server 125. The proxy server 125 can then de-multiplex the data requests to route the requests to their respective destination application servers. The multiplexing optimization reduces the TCP/IP overhead for opening and closing sockets as only one socket has to be opened/closed. In poor network conditions where packet loss or delay can occur, retransmissions need only occur for one TCP socket instead of multiple TCP sockets. This increases signaling and battery savings.

In some embodiments, the socket multiplexer/de-multiplexer 355 can open a TCP socket to a proxy server in response to a data transfer request from a mobile application. When a another data transfer request from another mobile application is received, the socket multiplexer/de-multiplexer multiplexes the TCP socket for the first mobile application and the TCP socket for the second mobile application through a single socket to allow the data transfer requests from both the applications to go through the same TCP socket to the proxy server. When the proxy server receives the data transfer requests through its socket, the proxy server can de-multiplex the requests to send the requests to their respective application servers. Similarly, the socket multiplexer/de-multiplexer 355 can also de-multiplex responses/requests from multiple application servers directed to multiple mobile applications received through a single TCP socket and provide the responses/requests to respective mobile applications.

FIG. 4 depicts a block diagram illustrating an example of server-side components, in certain embodiments of a distributed proxy and cache system residing on a host server 400 that manages traffic in a wireless network (or broadband network) for resource conservation, content caching, and/or traffic management. In some embodiments, the server-side proxy (or proxy server 125) can further include a transport protocol layer optimizer 500 which is described in detail with respect to FIG. 5 to optimize signaling and battery resources.

The host server 400 generally includes, for example, a network interface 408 and/or one or more repositories 412, 414, and 416. Note that server 400 may be any portable/mobile or non-portable device, server, cluster of computers and/or other types of processing units (e.g., any number of a machine shown in the example of FIG. 1B) able to receive or transmit signals to satisfy data requests over a network including any wired or wireless networks (e.g., Wi-Fi, cellular, Bluetooth, etc.).

The network interface 408 can include networking module(s) or devices(s) that enable the server 400 to mediate data in a network with an entity that is external to the host server 400, through any known and/or convenient communications protocol supported by the host and the external entity. Specifically, the network interface 408 allows the server 400 to communicate with multiple devices including mobile phone devices 450 and/or one or more application servers/content providers 410.

The host server 400 can store information about connections (e.g., network characteristics, conditions, types of connections, etc.) with devices in the connection metadata repository 412. Additionally, any information about third party application or content providers can also be stored in the repository 412. The host server 400 can store information about devices (e.g., hardware capability, properties, device settings, device language, network capability, manufacturer, device model, OS, OS version, etc.) in the device information repository 414. Additionally, the host server 400 can store information about network providers and the various network service areas in the network service provider repository 416.

The communication enabled by network interface 408 allows for simultaneous connections (e.g., including cellular connections) with devices 450 and/or connections (e.g., including wired/wireless, HTTP, Internet connections, LAN, Wi-Fi, etc.) with content servers/providers 410 to manage the traffic between devices 450 and content providers 410, for optimizing network resource utilization and/or to conserve power (battery) consumption on the serviced devices 450. The host server 400 can communicate with mobile devices 450 serviced by different network service providers and/or in the same/different network service areas. The host server 400 can operate and is compatible with devices 450 with varying types or levels of mobile capabilities, including by way of example but not limitation, 1G, 2G, 2G transitional (2.5G, 2.75G), 3G (IMT-2000), 3G transitional (3.5G, 3.75G, 3.9G), 4G (IMT-advanced), etc.

In general, the network interface 408 can include one or more of a network adaptor card, a wireless network interface card (e.g., SMS interface, Wi-Fi interface, interfaces for various generations of mobile communication standards including but not limited to 1G, 2G, 3G, 3.5G, 4G type networks such as LTE, WiMAX, etc.), Bluetooth, Wi-Fi, or any other network whether or not connected via a router, an access point, a wireless router, a switch, a multilayer switch, a protocol converter, a gateway, a bridge, a bridge router, a hub, a digital media receiver, and/or a repeater.

The host server 400 can further include server-side components of the distributed proxy and cache system which can include a proxy server 125 and a server cache 435. In some embodiments, the proxy server 125 can include an HTTP access engine 445, a caching policy manager 455, a proxy controller 465, a traffic shaping engine 375, a new data detector 447 and/or a connection manager 495.

The HTTP access engine 445 may further include a heartbeat manager 498; the proxy controller 465 may further include a data invalidator module 468; the traffic shaping engine 475 may further include a control protocol 476 and a batching module 477. Additional or less components/modules/engines can be included in the proxy server 125 and each illustrated component.

In the example of a device (e.g., mobile device 450) making an application or content request to an application server or content provider 410, the request may be intercepted and routed to the proxy server 125 which is coupled to the device 450 and the application server/content provider 410. Specifically, the proxy server is able to communicate with the local proxy (e.g., proxy 175 of the examples of FIG. 1C) of the mobile device 450, the local proxy forwards the data request to the proxy server 125 in some instances for further processing and, if needed, for transmission to the application server/content server 410 for a response to the data request.

In such a configuration, the host 400, or the proxy server 125 in the host server 400 can utilize intelligent information provided by the local proxy in adjusting its communication with the device in such a manner that optimizes use of network and device resources. For example, the proxy server 125 can identify characteristics of user activity on the device 450 to modify its communication frequency. The characteristics of user activity can be determined by, for example, the activity/behavior awareness module 466 in the proxy controller 465 via information collected by the local proxy on the device 450.

In some embodiments, communication frequency can be controlled by the connection manager 495 of the proxy server 125, for example, to adjust push frequency of content or updates to the device 450. For instance, push frequency can be decreased by the connection manager 495 when characteristics of the user activity indicate that the user is inactive. In some embodiments, when the characteristics of the user activity indicate that the user is subsequently active after a period of inactivity, the connection manager 495 can adjust the communication frequency with the device 450 to send data that was buffered as a result of decreased communication frequency to the device 450.

In addition, the proxy server 125 includes priority awareness of various requests, transactions, sessions, applications, and/or specific events. Such awareness can be determined by the local proxy on the device 450 and provided to the proxy server 125. The priority awareness module 467 of the proxy server 125 can generally assess the priority (e.g., including time-criticality, time-sensitivity, etc.) of various events or applications; additionally, the priority awareness module 467 can track priorities determined by local proxies of devices 450.

In some embodiments, through priority awareness, the connection manager 495 can further modify communication frequency (e.g., use or radio as controlled by the radio controller 496) of the server 400 with the devices 450. For example, the server 400 can notify the device 450, thus requesting use of the radio if it is not already in use when data or updates of an importance/priority level which meets a criteria becomes available to be sent.

In some embodiments, the proxy server 125 can detect multiple occurrences of events (e.g., transactions, content, data received from server/provider 410) and allow the events to accumulate for batch transfer to device 450. Batch transfer can be cumulated and transfer of events can be delayed based on priority awareness and/or user activity/application behavior awareness as tracked by modules 467 and/or 466. For example, batch transfer of multiple events (of a lower priority) to the device 450 can be initiated by the batching module 477 when an event of a higher priority (meeting a threshold or criteria) is detected at the server 400. In addition, batch transfer from the server 400 can be triggered when the server receives data from the device 450, indicating that the device radio is already in use and is thus on. In some embodiments, the proxy server 125 can order the each messages/packets in a batch for transmission based on event/transaction priority such that higher priority content can be sent first in case connection is lost or the battery dies, etc.

In some embodiments, the server 400 caches data (e.g., as managed by the caching policy manager 455) such that communication frequency over a network (e.g., cellular network) with the device 450 can be modified (e.g., decreased). The data can be cached, for example, in the server cache 435 for subsequent retrieval or batch sending to the device 450 to potentially decrease the need to turn on the device 450 radio. The server cache 435 can be partially or wholly internal to the host server 400, although in the example of FIG. 5A it is shown as being external to the host 400. In some instances, the server cache 435 may be the same as and/or integrated in part or in whole with another cache managed by another entity (e.g., the optional caching proxy server 199 shown in the example of FIG. 1C), such as being managed by an application server/content provider 410, a network service provider, or another third party.

In some embodiments, content caching is performed locally on the device 450 with the assistance of host server 400. For example, proxy server 125 in the host server 400 can query the application server/provider 410 with requests and monitor changes in responses. When changed or new responses are detected (e.g., by the new data detector 447), the proxy server 125 can notify the mobile device 450 such that the local proxy on the device 450 can make the decision to invalidate (e.g., indicated as outdated) the relevant cache entries stored as any responses in its local cache. Alternatively, the data invalidator module 468 can automatically instruct the local proxy of the device 450 to invalidate certain cached data, based on received responses from the application server/provider 410. The cached data is marked as invalid, and can get replaced or deleted when new content is received from the content server 410.

Note that data change can be detected by the detector 447 in one or more ways. For example, the server/provider 410 can notify the host server 400 upon a change. The change can also be detected at the host server 400 in response to a direct poll of the source server/provider 410. In some instances, the proxy server 125 can in addition, pre-load the local cache on the device 450 with the new/updated data. This can be performed when the host server 400 detects that the radio on the mobile device is already in use, or when the server 400 has additional content/data to be sent to the device 450.

One or more the above mechanisms can be implemented simultaneously or adjusted/configured based on application (e.g., different policies for different servers/providers 410). In some instances, the source provider/server 410 may notify the host 400 for certain types of events (e.g., events meeting a priority threshold level). In addition, the provider/server 410 may be configured to notify the host 400 at specific time intervals, regardless of event priority.

In some embodiments, the proxy server 125 of the host 400 can monitor/track responses received for the data request from the content source for changed results prior to returning the result to the mobile device, such monitoring may be suitable when data request to the content source has yielded same results to be returned to the mobile device, thus preventing network/power consumption from being used when no new changes are made to a particular requested. The local proxy of the device 450 can instruct the proxy server 125 to perform such monitoring or the proxy server 125 can automatically initiate such a process upon receiving a certain number of the same responses (e.g., or a number of the same responses in a period of time) for a particular request.

In some embodiments, the server 400, through the activity/behavior awareness module 466, is able to identify or detect user activity at a device that is separate from the mobile device 450. For example, the module 466 may detect that a user's message inbox (e.g., email or types of inbox) is being accessed. This can indicate that the user is interacting with his/her application using a device other than the mobile device 450 and may not need frequent updates, if at all.

The server 400, in this instance, can thus decrease the frequency with which new or updated content is sent to the mobile device 450, or eliminate all communication for as long as the user is detected to be using another device for access. Such frequency decrease may be application specific (e.g., for the application with which the user is interacting with on another device), or it may be a general frequency decrease (e.g., since the user is detected to be interacting with one server or one application via another device, he/she could also use it to access other services.) to the mobile device 450.

In some embodiments, the host server 400 is able to poll content sources 410 on behalf of devices 450 to conserve power or battery consumption on devices 450. For example, certain applications on the mobile device 450 can poll its respective server 410 in a predictable recurring fashion. Such recurrence or other types of application behaviors can be tracked by the activity/behavior module 466 in the proxy controller 465. The host server 400 can thus poll content sources 410 for applications on the mobile device 450 that would otherwise be performed by the device 450 through a wireless (e.g., including cellular connectivity). The host server can poll the sources 410 for new or changed data by way of the HTTP access engine 445 to establish HTTP connection or by way of radio controller 496 to connect to the source 410 over the cellular network. When new or changed data is detected, the new data detector 447 can notify the device 450 that such data is available and/or provide the new/changed data to the device 450.

In some embodiments, the connection manager 495 determines that the mobile device 450 is unavailable (e.g., the radio is turned off) and utilizes SMS to transmit content to the device 450, for instance, via the SMSC shown in the example of FIG. 1C. SMS is used to transmit invalidation messages, batches of invalidation messages, or even content in the case where the content is small enough to fit into just a few (usually one or two) SMS messages. This avoids the need to access the radio channel to send overhead information. The host server 400 can use SMS for certain transactions or responses having a priority level above a threshold or otherwise meeting a criteria. The server 400 can also utilize SMS as an out-of-band trigger to maintain or wake-up an IP connection as an alternative to maintaining an always-on IP connection.

In some embodiments, the connection manager 495 in the proxy server 125 (e.g., the heartbeat manager 498) can generate and/or transmit heartbeat messages on behalf of connected devices 450 to maintain a backend connection with a provider 410 for applications running on devices 450.

For example, in the distributed proxy system, local cache on the device 450 can prevent any or all heartbeat messages needed to maintain TCP/IP connections required for applications from being sent over the cellular, or other, network and instead rely on the proxy server 125 on the host server 400 to generate and/or send the heartbeat messages to maintain a connection with the backend (e.g., application server/provider 110 in the example of FIG. 1B). The proxy server can generate the keep-alive (heartbeat) messages independent of the operations of the local proxy on the mobile device.

The repositories 412, 414, and/or 416 can additionally store software, descriptive data, images, system information, drivers, and/or any other data item utilized by other components of the host server 400 and/or any other servers for operation. The repositories may be managed by a database management system (DBMS).

The repositories can be implemented via object-oriented technology and/or via text files and can be managed by a distributed database management system, an object-oriented database management system (OODBMS), a file system, and/or any other convenient or known database management package.

In some embodiments, the proxy server can include a transport protocol layer optimizer 500 which is described in detail with reference to FIG. 5. Referring to FIG. 5, the transport protocol layer optimizer 500 can perform similar functions as described with reference to the transport protocol layer optimizer 300. The transport protocol layer optimizer 500 can handle socket closure requests from the server-side (e.g., those initiated by the application servers with sockets to corresponding mobile applications on a mobile device). For example, the socket closing request manager 505 can manage socket closure requests initiated from the server-side. The socket closing request detector 510 can detect a socket closure request from an application server and the socket closing request alignment module 515 can delay the socket closure request from the application server until an indication regarding a radio state promotion event (i.e., radio turning on) is received or another request (e.g., from a different application server) for which it is necessary to turn on the radio is received. The socket closing request alignment module 515 can thus align multiple requests, at least one of which is a socket closing request, and transfer the multiple requests to a mobile device using a single radio connection. The destination host status detector 535 can determine (e.g., using keepalives or other mechanism) the health or status of one or more application servers and can provide such information to the local proxy to allow the local proxy to make decisions regarding whether to block retry attempts to establish a socket. The congestion detector 550 can monitor traffic in one or more mobile networks and detect congestion. Information regarding congestion can be provided to the local proxy. In some embodiments, the socket closing request manager 505 can use the congestion information to determine when to send socket closing requests to mobile devices. The socket multiplexer/de-multiplexer 555 can detect requests associated with multiple destination application servers received through a single TCP socket and de-multiplex the requests to extract individual requests. The individual requests can then be delivered to their respective destination applications. Similarly, the socket multiplexer/de-multiplexer 555 can also multiplex multiple requests from multiple application servers directed to multiple applications on a mobile device through a single TCP socket to the local proxy on the mobile device.

FIG. 6 is a logic flow diagram illustrating an example method of delaying socket closures until a radio is on to prevent socket closures from turning on the radio and thereby optimize signaling in a mobile network and conserving battery resources.

The example method 600 starts a transport protocol layer optimizer (e.g., transport protocol layer optimizer 300 of FIG. 3) detects a first mobile application's request to close a socket at block 605. The transport protocol layer optimizer then checks if a radio on the mobile device is on or in a connected mode. If the radio is on, as determined at decision block 610, the transport protocol layer optimizer sends the request to close the socket over the mobile network using the radio connection at block 630. If, however, the radio is not on, the transport protocol layer optimizer delays closing the socket at block 615. The delay can last for a pre-defined period of time, or until a request from a second mobile application that causes the radio to turn on is detected or received as determined at decision block 620. The transport protocol layer optimizer then sends the first mobile application's request to close the socket and the second mobile application's request which is unrelated to the first mobile application's request over the mobile network using the same radio connection at block 635. In some embodiments, if a request from the second mobile application that causes the radio to turn on (e.g., user interactive request, high priority or time critical request) is not detected as determined at decision block 620, the transport protocol layer optimizer can determine if the radio is turned on for any other reasons (e.g., radio can be turned on by the network when data is to be transmitted to the mobile device) at decision block 625. If the radio is turned on, the transport protocol layer optimizer sends the first request from the first application over the mobile network using the established radio connection at block 630. If the radio is not on, the transport protocol layer optimizer continues to delay the socket closure request at block 615.

Without a distributed proxy system, an application on a mobile device attempting to close its TCP socket while the radio is down causes signaling in the wireless network. With a distributed proxy system, the socket closure is deferred until radio comes up for other reasons. This avoids turning on of the radio just to close a TCP socket, and results in saving in signaling, as illustrated.

Without a distributed proxy system, when application requests a socket to close, the mobile device's TCP stack sends FIN, and server TCP stack's FIN/ACK response is not received by the mobile device, the mobile device's TCP stack will autonomously (without application knowing about it) keep retrying sending FINs and ACKs with increasing backoff algorithm, causing signaling in the wireless network. With the distributed proxy system, the local proxy replaces the FIN with RST packet, which does not require an acknowledgement back, and will not get retried. This results in signaling saving, particularly in unreliable networks.

Without a distributed proxy system, when an application opens a new socket in poor network conditions, the TCP stack will keep retrying the TCP SYN to open the socket even when the application has timed-out, resulting in additional signaling in the wireless network. With the distributed proxy system, the local proxy ensures that if the application is not expecting an answer anymore, the TCP stack stops retrying to open the socket (SYNs have similar back-off retry algorithm as FIN/ACKs), and thus saves on signaling, as illustrated. Even if the application has not timed out, the local proxy can retry less if it recognizes that the socket is not going to get opened (e.g., potentially not because the wireless network has problems, but the destination server is down and does not respond for example), and thus save on signaling, as illustrated.

Figure 7:
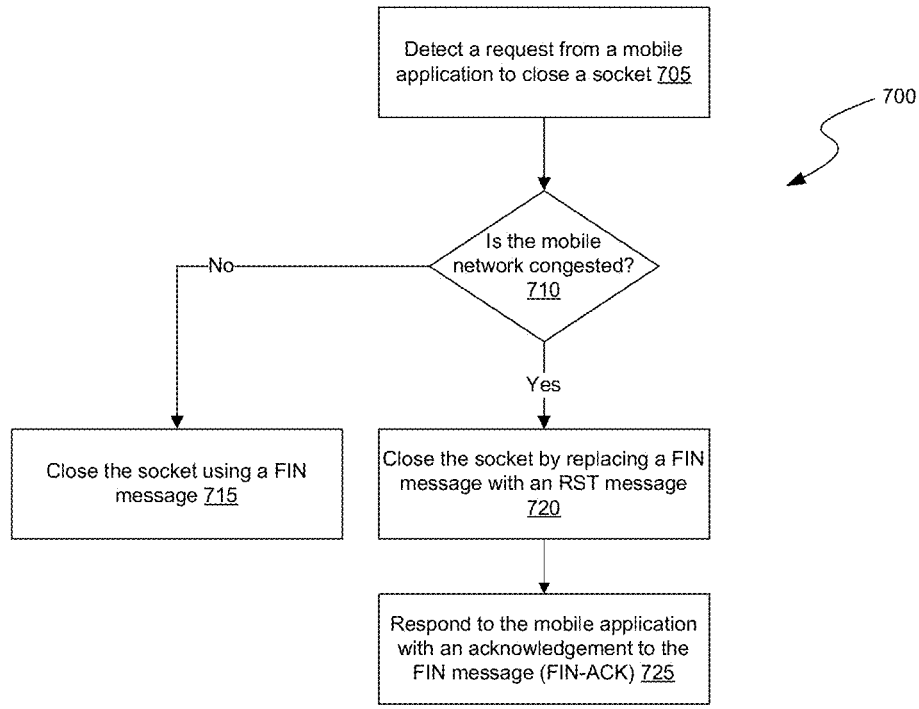
FIG. 7 is a logic flow diagram illustrating an example method of selecting a socket closing mechanism based on one or more criteria such as network congestion to prevent retry attempts to close the socket for optimizing signaling in a mobile network and conserving battery resources.

FIG. 7 is a logic flow diagram illustrating an example method of selecting a socket closing mechanism based on one or more criteria such as network congestion to prevent retry attempts to close the socket and thereby optimize signaling in a mobile network and conserving battery resources.

The example method 700 starts when a transport protocol layer optimizer (e.g., transport protocol layer optimizer 300 of FIG. 3) detects a request from a mobile application to close a socket at block 705. At decision block 710, the transport protocol layer optimizer determines if the mobile network is congested. The congestion can be detected based on various information such as the time it takes to establish a connection to the radio network, based on a number of attempts or retries to close the socket, based on congestion information provided by a remote entity (e.g., the proxy server 125, a network-side proxy, the base station). If the mobile network is congested, the transport protocol layer optimizer selects RST instead of FIN as the socket closing mechanism. The transport protocol layer optimizer replaces the FIN with the RST to close the socket at block 720. The transport protocol layer optimizer also responds to the mobile application with an acknowledgement to the FIN (i.e., FIN-ACK) at block 725 to prevent the mobile application from retrying to close the socket. By receiving the FIN-ACK, the mobile application recognizes that its request to close the socket has been acknowledged and in response the mobile application can send an ACK to confirm the socket closure. The transport protocol layer optimizer receiving the ACK does not send it on, as the RST mechanism does not require any acknowledgement. At decision block 710, if the mobile network is not congested, the transport protocol layer optimizer closes the socket using a FIN at block 715 as requested by the mobile application.

Figure 8:
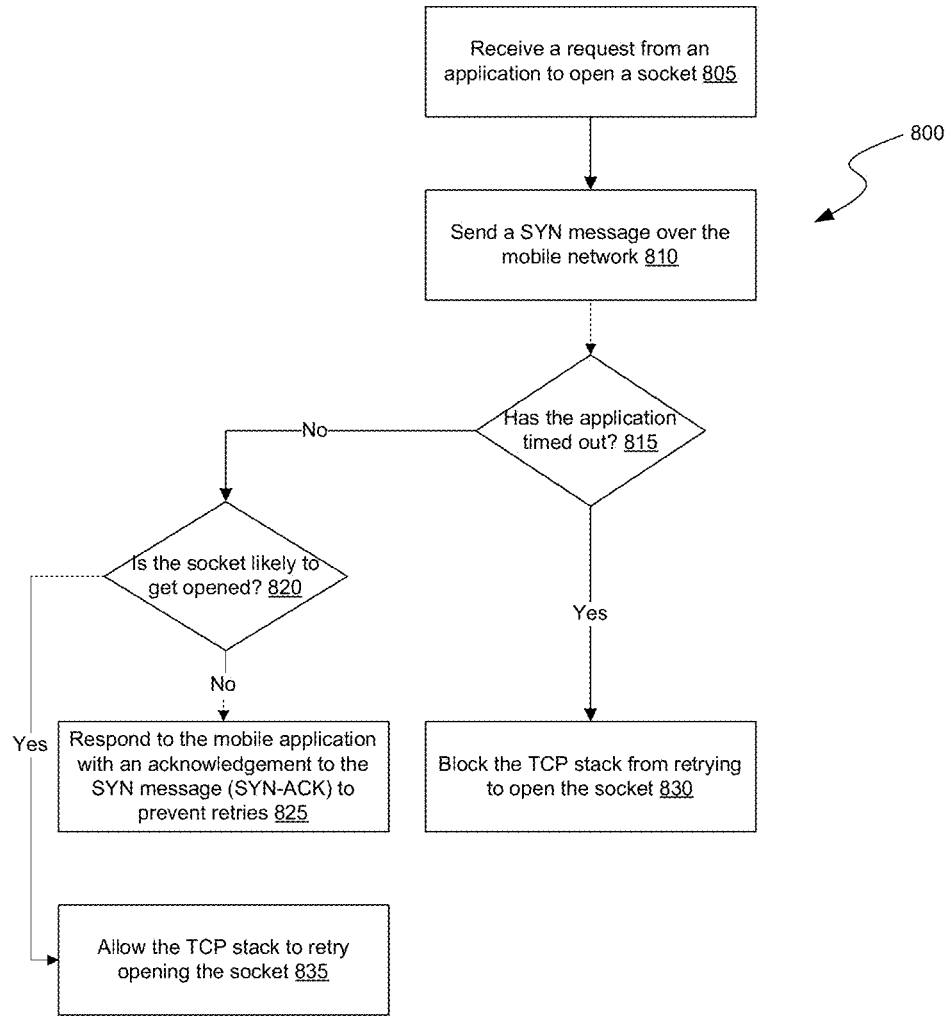
FIG. 8 is a logic flow diagram illustrating an example method of blocking retry attempts to open a socket after an application has timed out or even before the application has timed out when the socket is likely to not get opened for optimizing signaling in a mobile network and conserving battery resources.

FIG. 8 is a logic flow diagram illustrating an example method of blocking retry attempts to open a socket after an application has timed out or even before the application has timed out when the socket is likely to not get opened to optimize signaling in a mobile network and conserving battery resources.

The example method 800 starts a transport protocol layer optimizer (e.g., transport protocol layer optimizer 300 of FIG. 3) receives or detects a request from an application to open a socket at block 805. The transport protocol layer optimizer sends (or causes the TCP stack to send) a SYN over the mobile network at block 810 to open a socket to a remote entity (e.g., an application server associated with the application or a proxy server 125). At decision block 815, the transport protocol layer optimizer determines if the application has timed out while waiting for an acknowledgement from the remote entity (i.e., the application is no longer expecting an acknowledgement). If so, the transport protocol layer optimizer blocks the TCP stack from retrying to open the socket at block 830.

In some embodiments, even if the application has not timed out as determined at decision block 815, the transport protocol layer optimizer determines if the socket is likely to get opened at decision block 820. If the socket is not likely to get opened (e.g., because the remote entity is down or unavailable, the mobile network is congested), the transport protocol layer optimizer responds to the application with an acknowledgement to the SYN (SYN-ACK) to prevent the mobile application from retrying to open the socket at block 825. If the application has not timed out and the socket is likely to get opened, the transport protocol layer optimizer allows the TCP stack to make retry attempts to open the socket to the remote entity.

Figure 9:
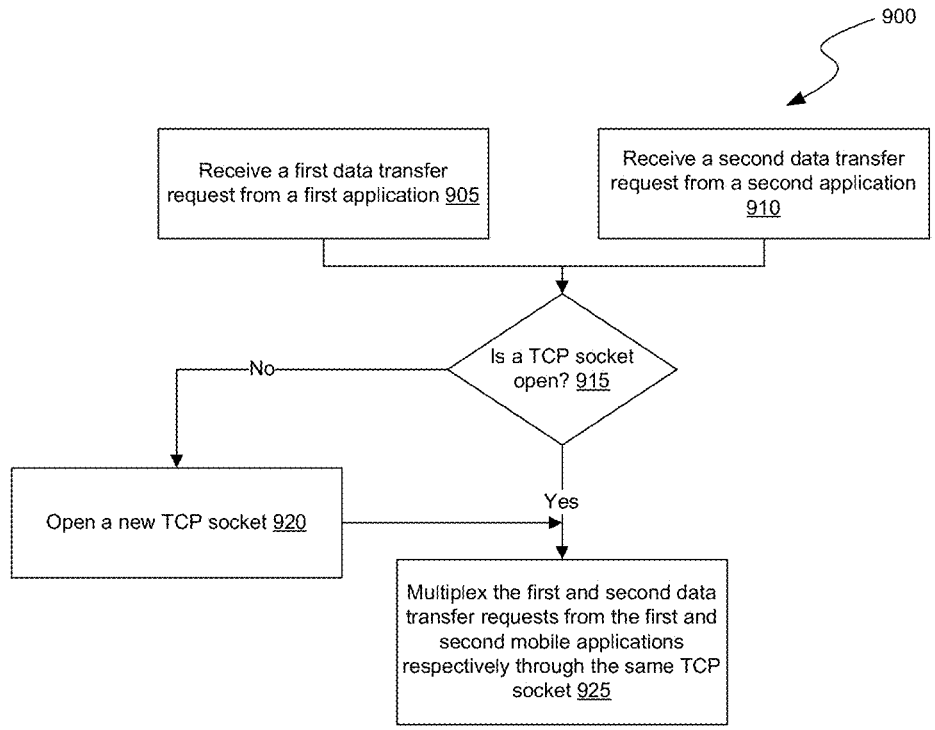
FIG. 9 is a logic flow diagram illustrating an example method of multiplexing requests from multiple applications through a single TCP socket to reduce TCP overhead of opening and closing sockets for optimizing signaling in a mobile network and conserving battery resources.

FIG. 9 is a logic flow diagram illustrating an example method of multiplexing requests from multiple applications through a single TCP socket to reduce TCP overhead of opening and closing sockets optimize signaling in a mobile network and conserving battery resources.

In the example method 900, a transport protocol layer optimizer (e.g., transport protocol layer optimizer 300 of FIG. 3) receives or detects a first data transfer request from a first application at block 905 and a second data transfer request from a second application at block 910. At decision block 915, the transport protocol layer optimizer determines if a TCP socket is open to a proxy server 125. If so, the transport protocol layer optimizer multiplexes the first and second data transfer requests through the TCP socket that is open at block 925. Conversely, if a TCP socket to the proxy server is not open, the transport protocol layer optimizer opens a new TCP socket to the proxy server at block 920 and then multiplexes the first and second data transfer requests through the new TCP socket at block 925.

A session-based protocol such as TCP includes a setup and tear down (or closure or termination) of the session. Within the session, zero or one or more higher level (e.g., HyperText Transfer Protocol or HTTP) transactions can take place. In a fixed line Internet or Wi-Fi, timing of the eventual socket closure does not carry a cost. But in a mobile Internet (i.e., wireless data service that allows users to connect to the Internet from a device connected to a cellular carrier or operator's data network or mobile network), sending any data over the mobile network involves cost on lower levels (i.e., at the Radio Network Controller (RNC) or radio layer) in bringing the lower level connection available for transmission of data packets for socket closure (TCP FIN or TCP RST packet). In other words, socket closures can trigger Radio Resource Control (RRC) connection to be established between the mobile device and the network, which involves signaling (i.e., exchange of messages) between the mobile device and the network.

The disclosed systems and methods can optimize the signaling caused by the socket closure.

In one embodiment, the disclosed systems and methods can optimize application-initiated socket closures. An application may close a session when the underlying radio connection is down (or idle). Typically, the session is closed after a delay following an actual higher level transaction (e.g., HTTP transaction) to allow a potential subsequent transaction to reuse the same session. When the application closes the session when the radio is idle, the session closure triggers the radio to get connected and causes signaling. In an event of an application-initiated socket closure, a local proxy (e.g., local proxy 175 of FIG. 1B, 275 of FIG. 2A) in the mobile device can acknowledge and close the socket towards the application, but delay the network side socket closure until radio comes up for other reasons, effectively aligning the socket closure to such other traffic. Consequently, signaling in the mobile network due to application-initiated socket closures is optimized.

In some cases a server may initiate a socket closure after an application has closed the socket, but the socket closure has been delayed by the local proxy, as described above. This would mean that to achieve signaling reduction, the session closure needs to be addressed also as a server-initiated socket closure.

A server with which an application has established a session may close the session by its own initiative. Servers typically close idle sessions (i.e., when there is no traffic) to conserve its resources, which are at least partially a function of number of open sessions from client applications. For example, a server may close idle sessions after four minutes if there is no traffic over such session. Such closure may cause a radio on a mobile device to go up. Further, because such transmission is server-initiated, it involves more radio/RNC signaling as the network needs to page the mobile device to trigger initiation of the radio connection.

In one embodiment, the server-initiated closures are addressed through a combination of implementing a server-side proxy (e.g., proxy server 125 of FIG. 1B or a proxy server that resides on or is associated with a carrier network) and the local proxy 175 (which aligns socket closure with other outgoing traffic) since the mobile application will eventually close the session. The proxy server can, for example, intercept and drop TCP RST packets. In one implementation, the local proxy 175 may proactively close the session towards the application and delay the socket closure towards the server until radio comes up, in case it is needed for conserving resources (open sockets/sessions) in the device.

In another embodiment, these server-initiated closures are addressed by closing both network and application side sockets proactively when the radio is up (or connected or powered on) to avoid a subsequent server-initiated closure to bring the radio up. The server and application side closures can be managed to achieve a balance between reduction of signaling by closing the socket early without additional signaling impact, and overhead to establish an additional session in case the application would reuse the session before it would have been closed without the proactive closure. The additional sessions do not cause signaling impact, but they add traffic (bytes) transferred over the network. Examples of methods for closing both network and application side sockets proactively are described in detail below.

(1) An example method involves closing all sockets immediately after a transaction is identified to be complete (e.g. HTTP, HTTPS transaction). As the radio is already up (i.e., connected or powered) at the end of the transaction, the closure would not cause additional signaling.

(2) Another example method involves identifying specific user, application, host, port, protocol, content type and/or other parameters and/or combinations thereof where the reuse of the socket is zero or minimal and applying the example method (1) described above to those combinations only (or exclude combinations with high reuse), so that the overhead is minimized. This identification can be done, for example, online (or in real time or near real time) in the local proxy 275, or offline for one or more users.

(3) Another example method involves identifying optimal parameters X, Y and Z for user/application/host/port/etc., combinations, where X indicates seconds from the proactive socket closure to next transaction(s) (transaction count of Z) in the same scope (app/host/port/etc.), and Y indicates minutes to hold off from implementing the example method (1) if Z transactions occurred in X seconds after the proactive socket closure. This allows establishing a safeguard to avoid closing sockets frequently in case a socket is reused multiple times. In some observations, same socket is observed to be used, for example, 800 times in one second intervals. This identification of the optimal parameters can be done, for example, online in the client or local proxy 175, or offline for one or more users.

(4) Yet another example method involves identifying optimal delay K for a given user/application/host/port/etc., that is shorter that the server delay for closing the session, and then performing a delayed socket closure once the radio comes up (or is connected or powered on) next time. This identification of the optimal delay can be done, for example, online in the client proxy, or offline for one or more users.

Where the closure is triggered by radio coming up for the next time after a delay of K: the delay can be calculated from an end of a transaction (if the application level protocol is recognized, such as HTTP), or from the timestamp of last data transfer over the TCP socket (a generic case without dependency to recognizing the application level protocol). The "radio up" can be indicative of many things, including that radio has gone idle, is and gets connected again due to some traffic to trigger preemptive socket closure (PSC), that the radio has not gone idle, but the delay K has passed and there is new traffic, and PSC can then be triggered, or when the delay K has passed, but the radio is still up/connected, even if there is no new traffic, PSC can be triggered. The downside of this is that it resets the dormancy timer of the network (because of the traffic it generates—dormancy timer is reset for any traffic), and thus extends the time after which the radio goes idle—causing extra Time Connected and battery drain.

A method of delaying requests to close connections to reduce signaling in a mobile network is provided. The method includes receiving a first request from a first mobile application on a mobile device to close a connection between the first mobile application and an application server associated with the first mobile application, wherein the first request is received while a radio of the mobile device is turned off, and wherein the first request to close the connection is a Transport Control Protocol (TCP) FIN or a TCP RST.

A method of delaying requests to close connections to reduce signaling in a mobile network is provided. The method includes receiving a request from a first mobile application on a mobile device to close a connection between the first mobile application and an application server associated with the first mobile application, wherein the request is received while a radio of the mobile device is turned off; delaying the request to close the connection until one of a predetermined delay has passed or a radio connection is established with the mobile network; and after delaying the request, sending the request to close the connection to the mobile network using the radio connection to reduce signaling in the mobile network. Delaying the request to close the connection until a radio connection is established may include delaying the request to close the connection until a radio connection is established in response to network traffic after the radio has gone idle. Delaying the request to close the connection until a radio connection is established includes, when the radio has not gone idle, delaying the request to close the connection until the predetermined delay has passed and there is new network traffic. The predetermined delay may include determining a delay based on a last transaction time.

A method to reduce signaling in a mobile network is provided. The method includes, on a mobile device, completing a transaction with a server; and in response to completing a transaction with a server, closing a connection between the mobile device and the server according to at least one rule. In one or more embodiments, the rule includes closing the connection immediately after completing the transaction with the server. In one or more embodiments, the rule includes identifying parameters related to a specific user, application, host, port, protocol, content type, and combinations thereof. In one or more embodiments, the rule includes a time from closing the connection to an expected next transaction with further reference to an additional rule that includes the number of transactions attempting to occur after closing the connection.

Figure 10:
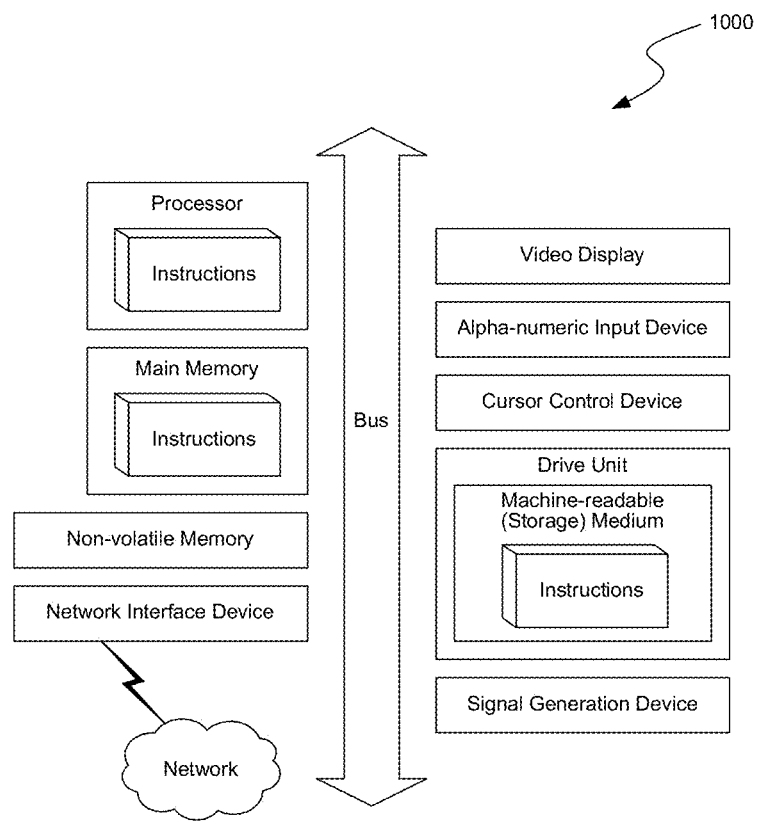
FIG. 10 shows a diagrammatic representation of a machine in the example form of a computer system within which a set of instructions, for causing the machine to perform any one or more of the methodologies discussed herein, may be executed.

FIG. 10 shows a diagrammatic representation of a machine in the example form of a computer system within which a set of instructions, for causing the machine to perform any one or more of the methodologies discussed herein, may be executed.

In the example of FIG. 10, the computer system 1000 includes a processor, memory, non-volatile memory, and an interface device. Various common components (e.g., cache memory) are omitted for illustrative simplicity. The computer system 1000 is intended to illustrate a hardware device on which any of the components depicted in the example of FIG. 2 (and any other components described in this specification) can be implemented. The computer system 1000 can be of any applicable known or convenient type. The components of the computer system 1000 can be coupled together via a bus or through some other known or convenient device.

The processor may be, for example, a conventional microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 1000. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system. The interface can include an analog modem, isdn modem, cable modem, token ring interface, satellite transmission interface (e.g. "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device.

In operation, the computer system 1000 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

What is claimed is:
1. A mobile device, comprising:
a memory; and
a processor, the mobile device configured to:
   detect a request from a mobile application on the mobile device to close a network connection over a mobile network with an application server;
   detect that the mobile network is unreliable and a connection to the application server cannot be established through another network, wherein the mobile network is unreliable when the mobile network is one of congested, inoperative, or non-responsive; and
   cause the network stack to utilize a second mechanism instead of a first mechanism in closing the network connection when the mobile network is unreliable so as to prevent additional signaling in the mobile network,
   wherein a source of the additional signaling includes at least one of the network stack or a change in a radio state of the mobile device from an idle state to a connected state,
   wherein the network stack is a Transport Control Protocol (TCP) stack and wherein the second mechanism closes the network connection using a TCP RST and the first mechanism is configured to close a network connection using a TCP FIN,
   wherein closing the network connection using the TCP RST avoids the need for the application server to send an acknowledgement and prevents the network stack from retrying to close the network connection if a prior attempt failed.

2. The mobile device of claim 1, wherein the mobile device is further configured to:
respond to the request from the mobile application to close the network connection in accordance with the first mechanism.

3. The mobile device of claim 1, wherein the second mechanism includes sending a TCP RST message to the mobile application.

4. The mobile device of claim 1, wherein the second mechanism includes ending a TCP RST message to the application server.

5. The mobile device of claim 1, wherein preventing additional signaling in the network includes preventing a radio in the mobile device from turning on unnecessarily.

6. A mobile device, comprising:
a memory; and
a processor, the mobile device configured to:
detect at least one attempt from the mobile application on the mobile device to establish a network connection over a mobile network with an application server;
detect at least one condition, wherein the at least one condition includes unavailability of the application server;
in response to detecting the at least one condition, prevent a network stack from making further attempts to establish the network connection to prevent additional signaling in the mobile network,
wherein the network stack is a Transport Control Protocol (TCP) stack,
wherein the at least one condition includes the mobile application timing out or no longer expecting a response,
wherein preventing additional signaling includes blocking traffic between the mobile application and the TCP stack via a firewall within the mobile device; and
provide a response to the mobile application to prevent the network stack from retrying to establish the network connection.

7. The mobile device of claim 6, wherein the application server is unavailable when the mobile network is one of congested, inoperative, or non-responsive.

8. The mobile device of claim 6, preventing additional signaling includes directing the traffic to operator-friendlier push mechanisms.

9. The mobile device of claim 6, wherein preventing additional signaling includes dropping a TCP connection from an application.

10. The mobile device of claim 6, wherein preventing additional signaling includes rejecting a TCP connection from an application.

* * * * *